(12) United States Patent
Fang

(10) Patent No.: US 10,444,951 B2
(45) Date of Patent: Oct. 15, 2019

(54) METHOD AND DEVICE FOR IDENTIFYING A LEFT-HAND OR A RIGHT-HAND MODE OF OPERATION ON A USER HANDHELD DEVICE

(71) Applicant: Huawei Technologies Co., Ltd., Shenzhen (CN)

(72) Inventor: Yuan Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 15/279,733

(22) Filed: Sep. 29, 2016

(65) Prior Publication Data
US 2017/0017799 A1 Jan. 19, 2017

Related U.S. Application Data

(63) Continuation of application No. PCT/CN2015/072531, filed on Feb. 9, 2015.

(30) Foreign Application Priority Data

Mar. 31, 2014 (CN) .......................... 2014 1 0126867

(51) Int. Cl.
*G06F 3/0484* (2013.01)
*G06F 3/0488* (2013.01)
*G06F 1/16* (2006.01)

(52) U.S. Cl.
CPC .......... *G06F 3/0484* (2013.01); *G06F 1/1626* (2013.01); *G06F 3/0488* (2013.01); *G06F 3/04883* (2013.01)

(58) Field of Classification Search
CPC .. G06F 3/0488; G06F 3/04883; G06F 3/0484; G06F 21/31; G06F 21/46
See application file for complete search history.

(56) References Cited

U.S. PATENT DOCUMENTS 8,665,238 B1 3/2014 Gossweiler, III et al.
8,769,431 B1 * 7/2014 Prasad .................... G06F 3/048
715/788
(Continued)

FOREIGN PATENT DOCUMENTS

CN 102096513 A * 6/2011
CN 102449573 A 5/2012
(Continued)

OTHER PUBLICATIONS

Machine Translation and Abstract of Korean Publication No. KR20120001941, Jan. 5, 2012, 22 pages.
(Continued)

*Primary Examiner* — Kieu D Vu
*Assistant Examiner* — Rami R Okasha
(74) *Attorney, Agent, or Firm* — Conley Rose, P.C.

(57) ABSTRACT

A method for identifying a user operation mode on a handheld device and a handheld device is presented, where the method includes, when it is detected that a finger of a user slides on a screen of the handheld device, acquiring sliding information of the finger of the user in a sliding process, and identifying an operation mode of the user according to the sliding information of the finger of the user in the sliding process, where the operation mode includes a left-hand operation mode and a right-hand operation mode. Using the foregoing manner, a user operation mode may be identified and accuracy of identification can be increased, without an additional cost.

12 Claims, 13 Drawing Sheets

(56) References Cited

U.S. PATENT DOCUMENTS

| | | | | |
|---|---|---|---|---|
| 9,035,875 B1* | 5/2015 | Tseng | ............... | G09G 5/00 345/156 |
| 2008/0204402 A1* | 8/2008 | Hirata | ............... | G06F 3/0481 345/156 |
| 2011/0035688 A1* | 2/2011 | Kinoshita | ............... | G06F 3/0481 715/763 |
| 2012/0139862 A1* | 6/2012 | Li | ............... | G06F 3/0482 345/173 |
| 2013/0100063 A1 | 4/2013 | Saeki | | |
| 2013/0188081 A1* | 7/2013 | Kulas | ............... | G06F 3/041 348/333.01 |
| 2013/0212535 A1* | 8/2013 | Kim | ............... | G06F 3/0482 715/841 |
| 2014/0085220 A1* | 3/2014 | Gossweiler, III | ............... | G06F 3/0488 345/173 |
| 2014/0101594 A1* | 4/2014 | Ouyang | ............... | G06F 3/0236 715/773 |
| 2014/0105573 A1* | 4/2014 | Hanckmann | ............... | G06K 9/00718 386/241 |
| 2014/0111451 A1* | 4/2014 | Park | ............... | G06F 3/04883 345/173 |
| 2015/0015506 A1* | 1/2015 | Lares | ............... | G06F 3/0488 345/173 |
| 2015/0077395 A1 | 3/2015 | Ikeda et al. | | |
| 2015/0242117 A1* | 8/2015 | Nakashima | ............... | G06F 3/04883 715/773 |

FOREIGN PATENT DOCUMENTS

| | | | |
|---|---|---|---|
| CN | 102624977 A | | 8/2012 |
| CN | 202475551 U | * | 10/2012 |
| CN | 102799268 A | | 11/2012 |
| CN | 102830935 A | * | 12/2012 |
| CN | 103354581 A | | 10/2013 |
| JP | 2011081646 A | | 4/2011 |
| JP | 2011081646 A | * | 4/2011 |
| JP | 2013003949 A | | 1/2013 |
| JP | 2013232118 A | | 11/2013 |
| JP | 2013232118 A | * | 11/2013 |
| JP | 2014041498 A | | 3/2014 |
| KR | 20120001941 A | | 1/2012 |
| TW | 201101126 A | | 1/2011 |
| TW | 201327351 A | | 7/2013 |
| TW | 201329843 A | | 7/2013 |
| TW | M461837 A | | 9/2013 |
| WO | 2011158475 A1 | | 12/2011 |

OTHER PUBLICATIONS

Foreign Communication From a Counterpart Application, Korean Application No. 10-2016-7030111, Korean Office Action dated Dec. 13, 2017, 7 pages.

Foreign Communication From a Counterpart Application, Korean Application No. 10-2016-7030111, English Translation of Korean Office Action dated Dec. 13, 2017, 4 pages.

Machine Translation and Abstract of Japanese Publication No. JP2013003949, Jan. 7, 2013, 41 pages.

Machine Translation and Abstract of Japanese Publication No. JP2013232118, Nov. 14, 2013, 20 pages.

Foreign Communication From a Counterpart Application, Japanese Application No. 2016-559832, Japanese Office Action dated Aug. 22, 2017, 2 pages.

Foreign Communication From a Counterpart Application, Japanese Application No. 2016-559832, English Translation of Japanese Office Action dated Aug. 22, 2017, 3 pages.

Machine Translation and Abstract of Chinese Publication No. CN103354581, Oct. 16, 2013, 3 pages.

Machine Translation and Abstract of Taiwanese Publication No. TWM461837, Sep. 11, 2013, 26 pages.

Machine Translation and Abstract of Chinese Publication No. CN102799268, Nov. 28, 2012, 8 pages.

Machine Translation and Abstract of Chinese Publication No. CN103354581, Oct. 16, 2013, 9 pages.

"Database WPI," Week 201417, Thomson Scientific, XP002766289, 2 pages.

Foreign Communication From a Counterpart Application, European Application No. 15772243.0, Extended European Search Report dated Feb. 2, 2017, 7 pages.

Foreign Communication From a Counterpart Application, Taiwanese Application No. 10520412300, Taiwanese Office Action dated Apr. 6, 2016, 7 pages.

Foreign Communication From a Counterpart Application, Chinese Application No. 201410126867.1, Chinese Office Action dated Feb. 20, 2017, 6 pages.

Foreign Communication From a Counterpart Application, PCT Application No. PCT/CN2015/072531, English Translation of International Search Report dated May 4, 2015, 2 pages.

Foreign Communication From a Counterpart Application, PCT Application No. PCT/CN2015/072531, English Translation of Written Opinion dated May 4, 2015, 7 pages.

* cited by examiner

METHOD AND DEVICE FOR IDENTIFYING A LEFT-HAND OR A RIGHT-HAND MODE OF OPERATION ON A USER HANDHELD DEVICE

CROSS-REFERENCE TO RELATED APPLICATIONS

This application is a continuation of International Application No. PCT/CN2015/072531, filed on Feb. 9, 2015, which claims priority to Chinese Patent Application No. 201410126867.1, filed on Mar. 31, 2014. The disclosures of the aforementioned applications are hereby incorporated by reference in their entireties.

TECHNICAL FIELD

The present disclosure relates to the field of man-machine interaction technologies, and in particular, to a method for identifying a user operation mode on a handheld device and a handheld device.

BACKGROUND

It is common that, in real life a user operates a handheld device with a single hand in such cases as a user is taking a bus, or having a meal. A screen of a handheld device, for example, a mobile phone, in current markets is increasingly large. If a user interface (UI) is designed inappropriately, it is relatively difficult for a user to operate a mobile phone with a single hand. For this case, many applications require that a user operation mode be manually set, such as a left-hand operation mode or a right-hand operation mode, and then a display mode of the UI be determined according to the set operation mode.

In the prior art, there are two manners for acquiring a user operation mode, and one manner is manual setting. Application software generally provides two single-hand, that is, left-hand and right-hand, operation modes, and the user manually set the operation mode before using the application software. However, in some cases, for example, when the user stands in a bus and needs to switch often between a left hand and a right hand to hold a handheld device, in this case, the manual setting manner is apparently inconvenient. The other manner is automatically acquiring the user operation mode. There are two manners for automatically acquiring the user operation mode, and one manner is identifying the operation mode using a sensor inside a mobile phone. The second manner is identifying a left-hand or right-hand operation mode by calculating user sliding slope on a screen.

In long-term research and development, however, it is found that in the present application that, if an operation mode is identified only using a sensor, an additional cost is caused, and the accuracy of determining relies on sensitivity of the sensor; if a manner in which user sliding slope on a screen is calculated is used, the accuracy of determining is low, and the impact of differences of individual users is great.

SUMMARY

A main technical issue solved in the present disclosure is providing a method for identifying a user operation mode on a handheld device, and a handheld device, which can enrich the manner of identifying a user operation mode and increase the accuracy of identification, without an additional cost.

According to a first aspect, the present disclosure provides a method for identifying a user operation mode on a handheld device, including, when it is detected that a finger of a user slides on a screen of a handheld device, acquiring sliding information of the finger of the user in a sliding process, and identifying an operation mode of the user according to the sliding information of the finger of the user in the sliding process, where the operation mode includes a left-hand operation mode and a right-hand operation mode.

In a first possible implementation manner of the first aspect, the sliding information of the finger of the user in the sliding process includes both or either of a change situation of a contact area between the finger of the user and the screen in the sliding process and a change situation of a sliding acceleration of the finger of the user in the sliding process.

With reference to the first possible implementation manner of the first aspect, in a second possible implementation manner of the first aspect, the identifying an operation mode of the user according to the sliding information of the finger of the user in the sliding process includes, if the contact area between the finger of the user and the screen gradually becomes smaller from left to right, identifying that the operation mode of the user is the right-hand operation mode; or if the contact area between the finger of the user and the screen gradually becomes larger from left to right, identifying that the operation mode of the user is the left-hand operation mode.

With reference to the first possible implementation manner of the first aspect, in a third possible implementation manner of the first aspect, the identifying an operation mode of the user according to the sliding information of the finger of the user in the sliding process includes, if the sliding acceleration of the finger of the user gradually becomes higher from left to right, identifying that the operation mode of the user is the right-hand operation mode; or if the sliding acceleration of the finger of the user gradually becomes lower from left to right, identifying that the operation mode of the user is the left-hand operation mode.

With reference to the first possible implementation manner of the first aspect, in a fourth possible implementation manner of the first aspect, the identifying an operation mode of the user according to the sliding information of the finger of the user in the sliding process includes setting a weight value of the change situation of the contact area between the finger of the user and the screen in the sliding process to w2, and a weight value of the change situation of the sliding acceleration of the finger of the user in the sliding process to w3; if the contact area between the finger of the user and the screen gradually becomes smaller from left to right, determining that a probability of the right-hand operation mode of the user increases by the weight value w2, or if the contact area between the finger of the user and the screen gradually becomes larger from left to right, determining that a probability of the left-hand operation mode of the user increases by the weight value w2; if the sliding acceleration of the finger of the user gradually becomes higher from left to right, determining that the probability of the right-hand operation mode of the user increases by the weight value w3, or if the sliding acceleration of the finger of the user gradually becomes lower from left to right, determining that the probability of the left-hand operation mode of the user increases by the weight value w3; comparing magnitudes of the probability of the right-hand operation mode of the user and the probability of the left-hand operation mode of the user; and if the probability of the right-hand operation mode of the user is greater than the probability of the left-hand operation mode of the user, identifying that the operation mode of the user is the right-hand operation mode, or if the probability of the right-hand operation mode of the user is less than the probability of the left-hand operation mode of the user, identifying that the operation mode of the user is the left-hand operation mode.

With reference to the first possible implementation manner of the first aspect, in a fifth possible implementation manner of the first aspect, the sliding information of the finger of the user in the sliding process further includes a sliding direction of the finger of the user, and the identifying an operation mode of the user according to the sliding information of the finger of the user in the sliding process includes setting a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3; if the sliding direction of the finger of the user is rightward, determining that a probability of the right-hand operation mode of the user increases by the weight value w1, or if the sliding direction of the finger of the user is leftward, determining that a probability of the left-hand operation mode of the user increases by the weight value w1; if the contact area between the finger of the user and the screen gradually becomes smaller from left to right, determining that the probability of the right-hand operation mode of the user increases by the weight value w2, or if the contact area between the finger of the user and the screen gradually becomes larger from left to right, determining that the probability of the left-hand operation mode of the user increases by the weight value w2; if the sliding acceleration of the finger of the user gradually becomes higher from left to right, determining that the probability of the right-hand operation mode of the user increases by the weight value w3, or if the sliding acceleration of the finger of the user gradually becomes lower from left to right, determining that the probability of the left-hand operation mode of the user increases by the weight value w3; comparing magnitudes of the probability of the right-hand operation mode of the user and the probability of the left-hand operation mode of the user; and if the probability of the right-hand operation mode of the user is greater than the probability of the left-hand operation mode of the user, identifying that the operation mode of the user is the right-hand operation mode, or if the probability of the right-hand operation mode of the user is less than the probability of the left-hand operation mode of the user, identifying that the operation mode of the user is the left-hand operation mode.

With reference to the first possible implementation manner of the first aspect, in a sixth possible implementation manner of the first aspect, the sliding information of the finger of the user in the sliding process further includes an area within which a pixel passed by the finger of the user in the sliding process falls, and the identifying an operation mode of the user according to the sliding information of the finger of the user in the sliding process includes setting a weight value of the area within which the pixel passed by the finger of the user in the sliding process falls to w0, a weight value of the change situation of the contact area between the finger of the user and the screen in the sliding process to w2, and a weight value of the change situation of the sliding acceleration of the finger of the user in the sliding process to w3; if the pixel passed by the finger of the user falls within a right area of the screen, determining that a probability of the right-hand operation mode of the user increases by the weight value w0, or if the pixel passed by the finger of the user falls within a left area of the screen, determining that a probability of the left-hand operation mode of the user increases by the weight value w0; if the contact area between the finger of the user and the screen gradually becomes smaller from left to right, determining that the probability of the right-hand operation mode of the user increases by the weight value w2, or if the contact area between the finger of the user and the screen gradually becomes larger from left to right, determining that the probability of the left-hand operation mode of the user increases by the weight value w2; if the sliding acceleration of the finger of the user gradually becomes higher from left to right, determining that the probability of the right-hand operation mode of the user increases by the weight value w3, or if the sliding acceleration of the finger of the user gradually becomes lower from left to right, determining that the probability of the left-hand operation mode of the user increases by the weight value w3; comparing magnitudes of the probability of the right-hand operation mode of the user and the probability of the left-hand operation mode of the user; and if the probability of the right-hand operation mode of the user is greater than the probability of the left-hand operation mode of the user, identifying that the operation mode of the user is the right-hand operation mode, or if the probability of the right-hand operation mode of the user is less than the probability of the left-hand operation mode of the user, identifying that the operation mode of the user is the left-hand operation mode.

With reference to any possible implementation manner of the fourth, the fifth, and the sixth possible implementation manners of the first aspect, in a seventh possible implementation manner of the first aspect, the weight values w0, w1, w2, and w3 are set according to a size of the screen, and a sliding length and shape of the finger of the user on the screen.

With reference to the first aspect or any possible implementation manner of the first to the sixth possible implementation manners of the first aspect, in an eighth possible implementation manner of the first aspect, a sliding action of the finger of the user on the screen is an action of unlocking the screen.

With reference to the first aspect or any possible implementation manner of the first to the sixth possible implementation manners of the first aspect, in a ninth possible implementation manner of the first aspect, after the identifying an operation mode of the user according to the sliding information of the finger of the user in the sliding process, the method further includes automatically switching a display mode of an operation interface of the handheld device according to the operation mode of the user.

According to a second aspect, the present disclosure provides a handheld device, where the handheld device includes a detecting module, an acquiring module, and an identifying module, where the detecting module is configured to detect whether a finger of a user slides on a screen of the handheld device; the acquiring module is configured to, when the detecting module detects that the finger of the user slides on the screen of the handheld device, acquire sliding information of the finger of the user in a sliding process; and the identifying module is configured to identify an operation mode of the user according to the sliding information, acquired by the acquiring module, of the finger of the user in the sliding process, where the operation mode includes a left-hand operation mode and a right-hand operation mode.

In a first possible implementation manner of the second aspect, the sliding information of the finger of the user in the sliding process includes both or either of a change situation of a contact area between the finger of the user and the screen in the sliding process and a change situation of a sliding acceleration of the finger of the user in the sliding process.

With reference to the first possible implementation manner of the second aspect, in a second possible implementation manner of the second aspect, the identifying module includes a first judging unit and a first identifying unit, where the first judging unit is configured to determine whether the contact area between the finger of the user and the screen gradually becomes smaller from left to right; and the first identifying unit is configured to, when a result of the determining by the first judging unit is that the contact area between the finger of the user and the screen gradually becomes smaller from left to right, identify that the operation mode of the user is the right-hand operation mode, or the first identifying unit is further configured to, when a result of the determining by the first judging unit is that the contact area between the finger of the user and the screen gradually becomes larger from left to right, identify that the operation mode of the user is the left-hand operation mode.

With reference to the first possible implementation manner of the second aspect, in a third possible implementation manner of the second aspect, the identifying module includes a second judging unit and a second identifying unit, where the second judging unit is configured to determine whether the sliding acceleration of the finger of the user gradually becomes higher from left to right; and the second identifying unit is configured to, when a result of the determining by the second judging unit is that the sliding acceleration of the finger of the user gradually becomes higher from left to right, identify that the operation mode of the user is the right-hand operation mode, or the second identifying unit is further configured to, when a result of the determining by the second judging unit is that the sliding acceleration of the finger of the user gradually becomes lower from left to right, identify that the operation mode of the user is the left-hand operation mode.

With reference to the first possible implementation manner of the second aspect, in a fourth possible implementation manner of the second aspect, the identifying module includes a first setting unit, a first determining unit, a first comparing unit, and a third identifying unit, where the first setting unit is configured to set a weight value of the change situation of the contact area between the finger of the user and the screen in the sliding process to w2, and a weight value of the change situation of the sliding acceleration of the finger of the user in the sliding process to w3; the first determining unit is configured to, when the contact area between the finger of the user and the screen gradually becomes smaller from left to right, determine that a probability of the right-hand operation mode of the user increases by the weight value w2, or when the contact area between the finger of the user and the screen gradually becomes larger from left to right, determine that a probability of the left-hand operation mode of the user increases by the weight value w2; the first determining unit is further configured to, when the sliding acceleration of the finger of the user gradually becomes higher from left to right, determine that the probability of the right-hand operation mode of the user increases by the weight value w3, or when the sliding acceleration of the finger of the user gradually becomes lower from left to right, determine that the probability of the left-hand operation mode of the user increases by the weight value w3; the first comparing unit is configured to compare magnitudes of the probability of the right-hand operation mode of the user and the probability of the left-hand operation mode of the user; and the third identifying unit is configured to, when a result of the comparing by the first comparing unit is that the probability of the right-hand operation mode of the user is greater than the probability of the left-hand operation mode of the user, identify that the operation mode of the user is the right-hand operation mode, or when a result of the comparing by the first comparing unit is that the probability of the right-hand operation mode of the user is less than the probability of the left-hand operation mode of the user, identify that the operation mode of the user is the left-hand operation mode.

With reference to the first possible implementation manner of the second aspect, in a fifth possible implementation manner of the second aspect, the sliding information of the finger of the user in the sliding process further includes a sliding direction of the finger of the user, and the identifying module includes a second setting unit, a second determining unit, a second comparing unit, and a fourth identifying unit, where the second setting unit is configured to set a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3; the second determining unit is configured to, when the sliding direction of the finger of the user is rightward, determine that a probability of the right-hand operation mode of the user increases by the weight value w1, or when the sliding direction of the finger of the user is leftward, determine that a probability of the left-hand operation mode of the user increases by the weight value w1; the second determining unit is further configured to, when the contact area between the finger of the user and the screen gradually becomes smaller from left to right, determine that the probability of the right-hand operation mode of the user increases by the weight value w2, or when the contact area between the finger of the user and the screen gradually becomes larger from left to right, determine that the probability of the left-hand operation mode of the user increases by the weight value w2; the second determining unit is further configured to, when the sliding acceleration of the finger of the user gradually becomes higher from left to right, determine that the probability of the right-hand operation mode of the user increases by the weight value w3, or when the sliding acceleration of the finger of the user gradually becomes lower from left to right, determine that the probability of the left-hand operation mode of the user increases by the weight value w3; the second comparing unit is configured to compare magnitudes of the probability of the right-hand operation mode of the user and the probability of the left-hand operation mode of the user; and the fourth identifying unit is configured to, when a result of the comparing by the second comparing unit is that the probability of the right-hand operation mode of the user is greater than the probability of the left-hand operation mode of the user, identify that the operation mode of the user is the right-hand operation mode, or when a result of the comparing by the second comparing unit is that the probability of the right-hand operation mode of the user is less than the probability of the left-hand operation mode of the user, identify that the operation mode of the user is the left-hand operation mode.

With reference to the first possible implementation manner of the second aspect, in a sixth possible implementation manner of the second aspect, the sliding information of the finger of the user in the sliding process further includes an area within which a pixel passed by the finger of the user in the sliding process falls, and the identifying module includes a third setting unit, a third determining unit, a third comparing unit, and a fifth identifying unit, where the third setting unit is configured to set a weight value of the area within which the pixel passed by the finger of the user in the sliding process falls to w0, a weight value of the change situation of the contact area between the finger of the user and the screen in the sliding process to w2, and a weight value of the change situation of the sliding acceleration of the finger of the user in the sliding process to w3; the third determining unit is configured to, when the pixel passed by the finger of the user falls within a right area of the screen, determine that a probability of the right-hand operation mode of the user increases by the weight value w0, or when the pixel passed by the finger of the user falls within a left area of the screen, determine that a probability of the left-hand operation mode of the user increases by the weight value w0; the third determining unit is further configured to, when the contact area between the finger of the user and the screen gradually becomes smaller from left to right, determine that the probability of the right-hand operation mode of the user increases by the weight value w2, or when the contact area between the finger of the user and the screen gradually becomes larger from left to right, determine that the probability of the left-hand operation mode of the user increases by the weight value w2; the third determining unit is further configured to, when the sliding acceleration of the finger of the user gradually becomes higher from left to right, determine that the probability of the right-hand operation mode of the user increases by the weight value w3, or when the sliding acceleration of the finger of the user gradually becomes lower from left to right, determine that the probability of the left-hand operation mode of the user increases by the weight value w3; the third comparing unit is configured to compare magnitudes of the probability of the right-hand operation mode of the user and the probability of the left-hand operation mode of the user; and the fifth identifying unit is configured to, when a result of the comparing by the third comparing unit is that the probability of the right-hand operation mode of the user is greater than the probability of the left-hand operation mode of the user, identify that the operation mode of the user is the right-hand operation mode, or when a result of the comparing by the third comparing unit is that the probability of the right-hand operation mode of the user is less than the probability of the left-hand operation mode of the user, identify that the operation mode of the user is the left-hand operation mode.

With reference to any possible implementation manner of the fourth, the fifth, and the sixth possible implementation manners of the second aspect, in a seventh possible implementation manner of the second aspect, the weight values w0, w1, w2, and w3 are set according to a size of the screen, and a sliding length and shape of the finger of the user on the screen.

With reference to the second aspect or any possible implementation manner of the first to the sixth possible implementation manners of the second aspect, in a eighth possible implementation manner of the second aspect, a sliding action of the finger of the user on the screen is an action of unlocking the screen.

With reference to the second aspect or any possible implementation manner of the first to the sixth possible implementation manners of the second aspect, in a ninth possible implementation manner of the second aspect, the handheld device further includes a switching module, where the switching module is configured to automatically switch a display mode of an operation interface of the handheld device according to the operation mode of the user.

Beneficial effects of the present disclosure are as follows. Different from a situation in the prior art, in the present disclosure, when it is detected that a finger of a user slides on a screen of a handheld device, sliding information of the finger of the user in a sliding process is acquired, and an operation mode of the user is identified according to the sliding information of the finger of the user in the sliding process, where the operation mode includes a left-hand operation mode and a right-hand operation mode. Using this manner can enrich the manner for identifying a user operation mode and increase the accuracy of identification, without an additional cost.

DESCRIPTION OF EMBODIMENTS

The following briefly introduces an application scenario and a hardware environment of the present disclosure.

It is common that, in real life a user operates a handheld device with a single hand in such cases as a user is taking a bus, or having a meal. A screen of a handheld device, for example, a mobile phone, in current markets is increasingly large. If a UI is designed inappropriately, it is relatively difficult for a user to operate a mobile phone with a single hand. For this case, many applications require that a display manner of the UI be determined according to an operation mode of the user when a handheld device is operated with a single hand.

Figure 1:
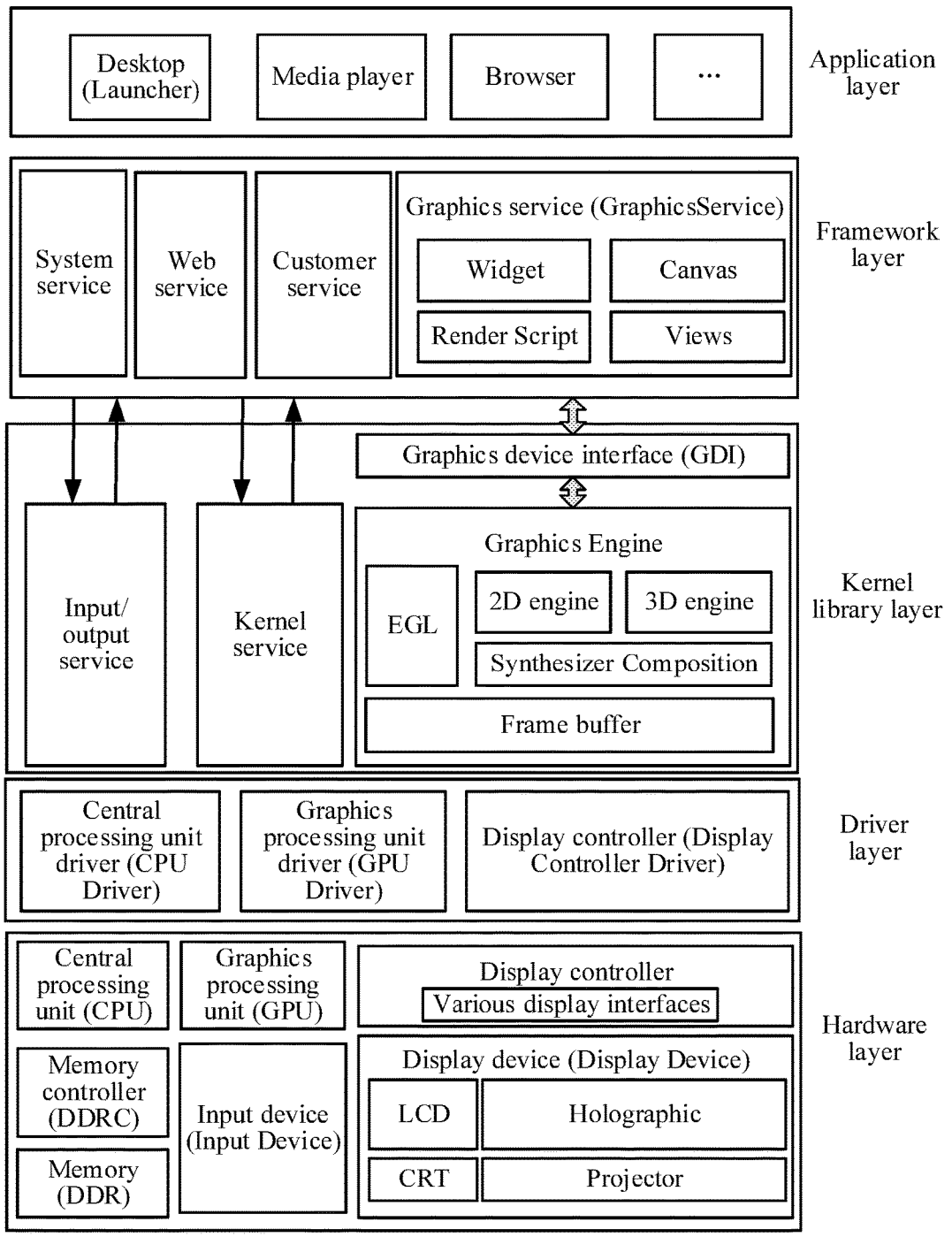
FIG. 1 is a schematic structural diagram of a handheld device according to the present disclosure.

Referring to FIG. 1, FIG. 1 is a schematic structural diagram of a handheld device according to the present disclosure. FIG. 1 is used as an example to introduce a logical structure of a handheld device applied in a method for identifying a user operation mode on a handheld device provided in implementation manners of the present disclosure. The handheld device may be a smartphone. As shown in FIG. 1, the hardware layer of the handheld device includes a central processing unit (CPU), a graphics processing unit (GPU), and the like, and certainly, may further include a storage, an input/output device, a memory, a memory controller, a network interface, and the like. The input device may include a touchscreen and the like. The output device may include a display device, such as a liquid crystal display (LCD), a cathode ray tube (CRT), holographic imaging, or a projector. An operating system (such as Android) and some application programs may run on the hardware layer. A kernel library is a core part of an operating system and includes an input/output service, a kernel service, a graphics device interface, a graphics engine that implements CPU and GPU graphics processing, and the like. In addition, the handheld device further includes a driver layer, a framework layer, and an application layer. The driver layer may include a CPU driver, a GPU driver, a display controller driver, and the like. The framework layer may include a system service, a web service, a customer service, and the like. The application layer may include a desktop (launcher), a media player, a browser, and the like.

The following describes the present disclosure in detail with reference to the accompanying drawings and embodiments.

Figure 2:
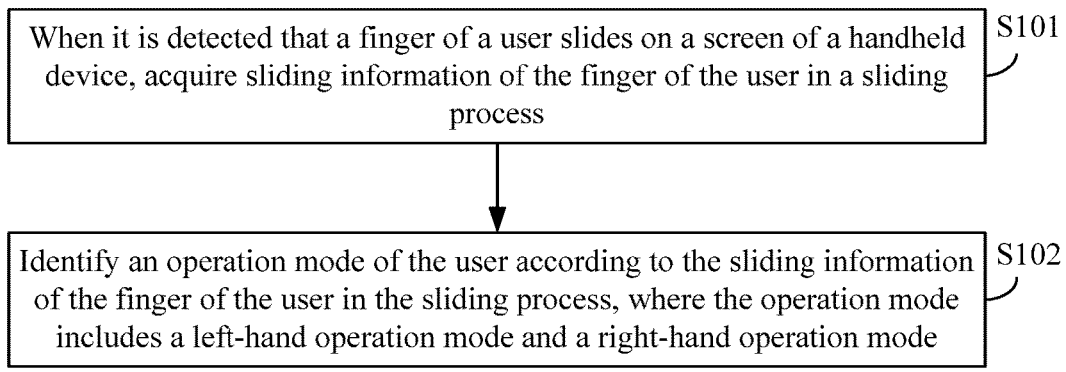
FIG. 2 is a flowchart of an implementation manner of a method for identifying a user operation mode on a handheld device according to the present disclosure.

Referring to FIG. 2, FIG. 2 is a flowchart of an implementation manner of a method for identifying a user operation mode on a handheld device according to the present disclosure, including the following steps.

Step S101: When it is detected that a finger of a user slides on a screen of a handheld device, acquire sliding information of the finger of the user in a sliding process.

Step S102: Identify an operation mode of the user according to the sliding information of the finger of the user in the sliding process, where the operation mode includes a left-hand operation mode and a right-hand operation mode.

When the finger of the user slides on the screen of the handheld device, a large amount of sliding information is generated, and acquiring the sliding information helps identify the operation mode of the user. Therefore, the operation mode of the user may be identified according to only the sliding information of the finger of the user in the sliding process. The operation mode includes the left-hand operation mode and the right-hand operation mode, where the left-hand operation mode is a mode in which the handheld device is operated with a left hand, and the right-hand operation mode is a mode in which the handheld device is operated with a right hand. That is, the left-hand operation mode indicates that the user operates the handheld device with the left hand, and the right-hand operation mode indicates that the user operates the handheld device with the right hand.

Because the sliding information is naturally generated when the finger of the user slides on the screen of the handheld device, the operation mode of the user may be identified using the sliding information, without additionally using another sensor, as long as the sliding information is captured or collected, which reduces a cost of the handheld device. In addition, the sliding information generated by the finger of the user in the sliding process generally includes a large amount of related sliding information, and comprehensive consideration of the sliding information helps improve accuracy of identification.

According to this implementation manner of the present disclosure, when it is detected that a finger of a user slides on a screen of a handheld device, sliding information of the finger of the user in a sliding process is acquired; and an operation mode of the user is identified according to the sliding information of the finger of the user in the sliding process. Using this manner can reduce the cost of a handheld device and improve the accuracy of identification when a user operation mode is identified.

Figure 3:
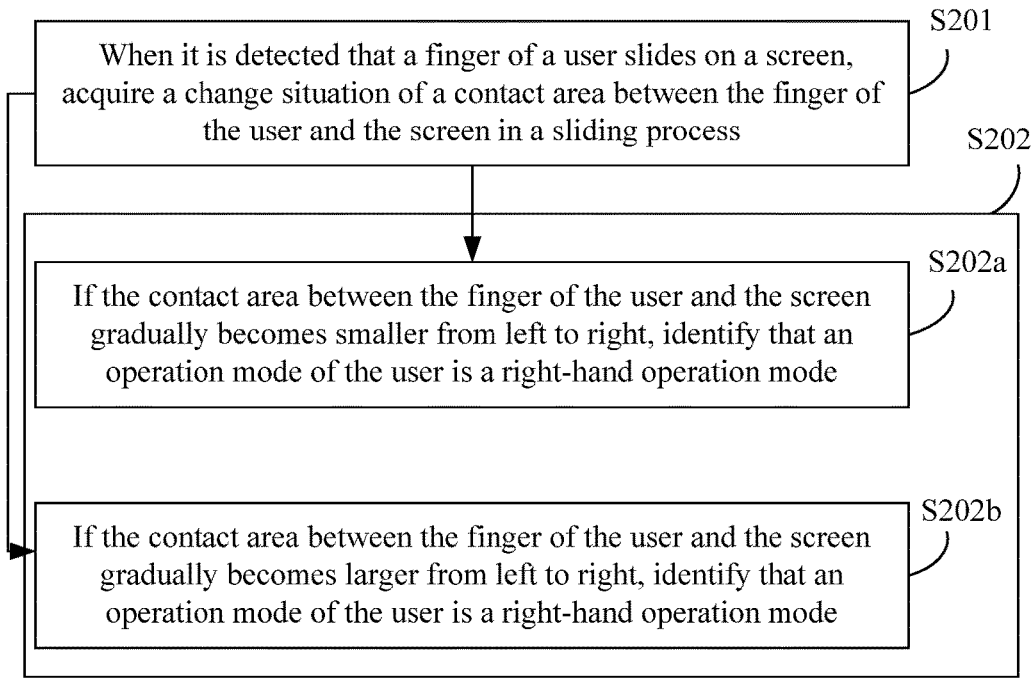
FIG. 3 is a flowchart of another implementation manner of the method for identifying a user operation mode on a handheld device according to the present disclosure.

Referring to FIG. 3, FIG. 3 is a flowchart of another implementation manner of the method for identifying a user operation mode on a handheld device according to the present disclosure.

Step S201: When it is detected that a finger of a user slides on a screen, acquire both or either of a change situation of a contact area between the finger of the user and the screen in a sliding process and a change situation of a sliding acceleration of the finger of the user in the sliding process.

When the finger of the user slides on the screen, the contact area between the finger and the screen continuously changes, and the sliding acceleration of the finger also continuously changes. The change situation of the contact area between the finger and the screen is acquired, or the change situation of the sliding acceleration of the finger is acquired, or the change situation of the contact area between the finger and the screen and the change situation of the sliding acceleration of the finger are acquired.

Step S202: Identify an operation mode of the user according to both or either of the change situation of the contact area between the finger of the user and the screen in the sliding process and the change situation of the sliding acceleration of the finger of the user in the sliding process.

Figure 4:
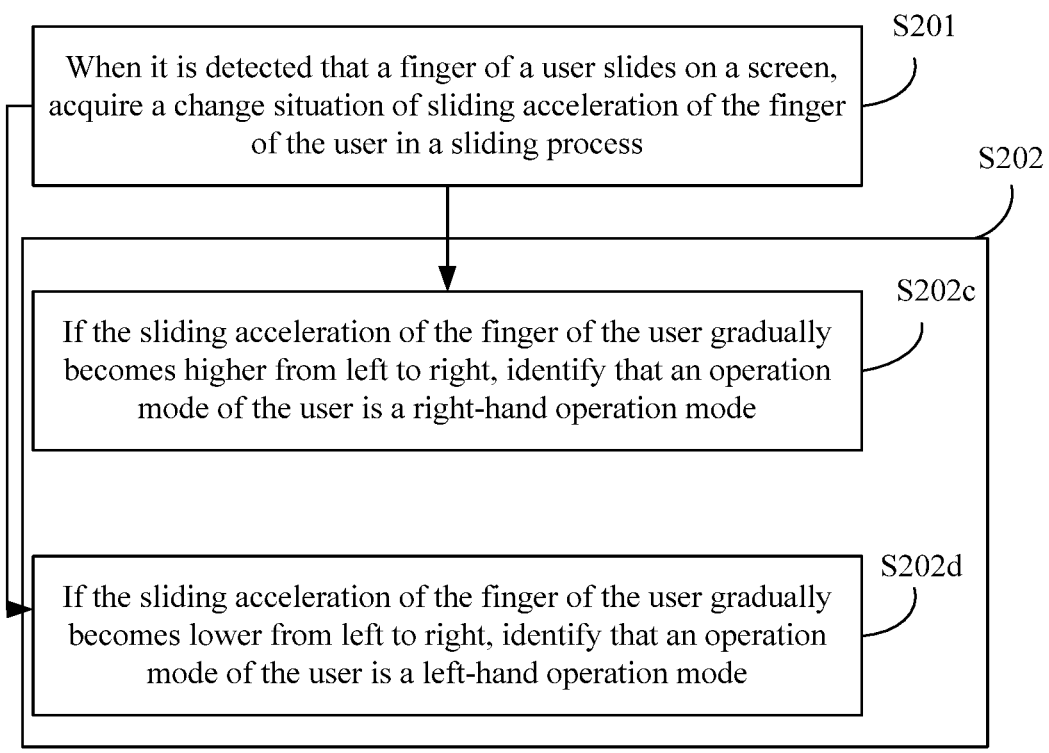
FIG. 4 is a flowchart of still another implementation manner of the method for identifying a user operation mode on a handheld device according to the present disclosure.
Figure 5:
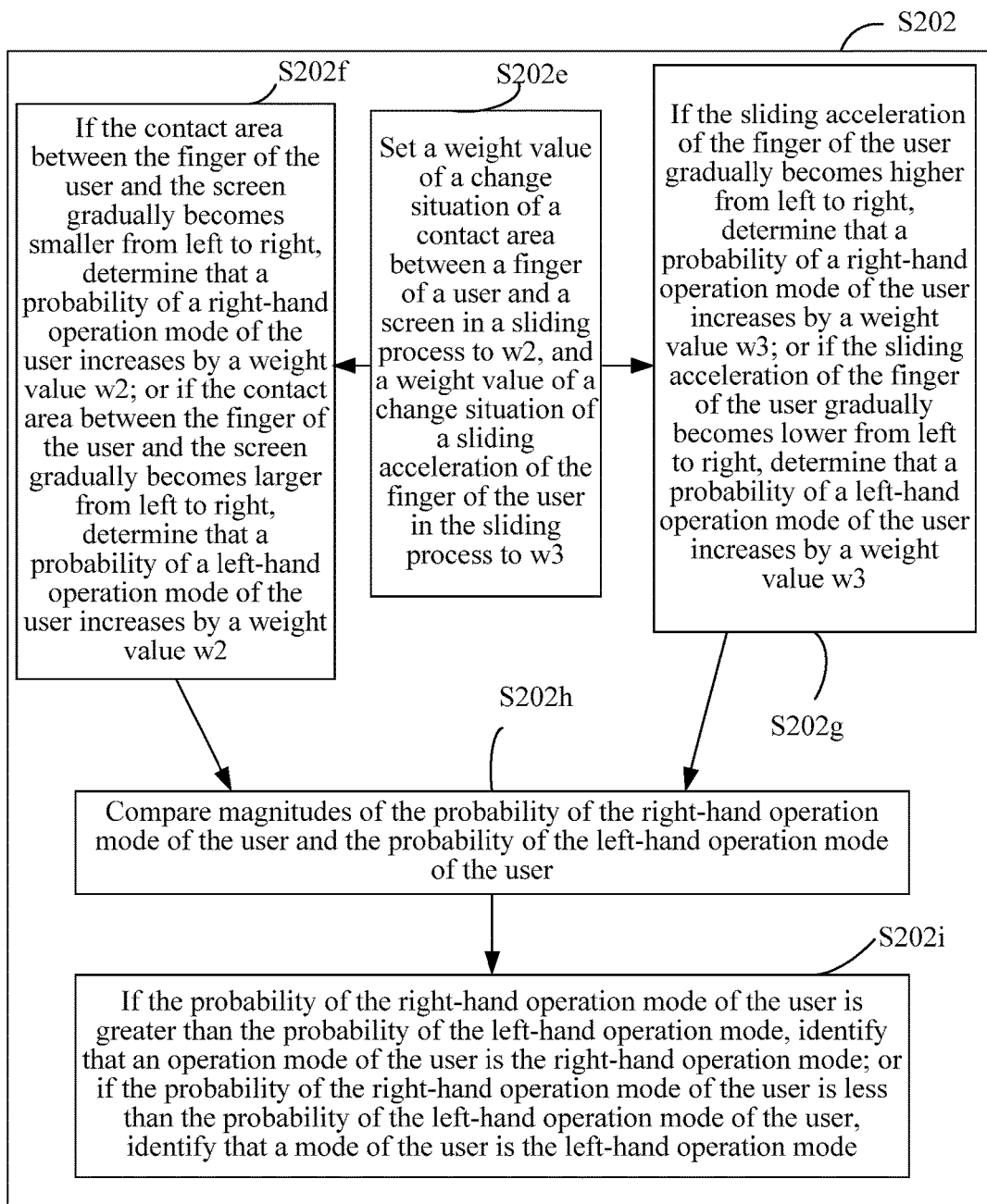
FIG. 5 is a flowchart of still another implementation manner of the method for identifying a user operation mode on a handheld device according to the present disclosure.

When a left-hand finger and a right-hand finger slide on the screen, change laws are different between the left hand and the right in terms of the change situation of the contact area between the finger and the screen and the change situation of the sliding acceleration of the finger. Therefore, the operation mode of the user may be identified according to both or either of the change situation of the contact area between the finger and the screen and the change situation of the sliding acceleration of the finger. Referring to FIG. 3 to FIG. 5, step S202 may include step S202a and step S202b, or step S202 may include step S202c and step S202d, or step S202 may include step S202e, step S202f, step S202g, step S202h, and step S202i.

Referring to FIG. 3, if sliding information of the finger of the user in the sliding process is the change situation of the contact area between the finger of the user and the screen in the sliding process, step S202 includes step S202a and step S202b.

Step S202a: If the contact area between the finger of the user and the screen gradually becomes smaller from left to right, identify that an operation mode of the user is a right-hand operation mode.

Step S202b: If the contact area between the finger of the user and the screen gradually becomes larger from left to right, identify that an operation mode of the user is a left-hand operation mode.

Referring to FIG. 4, after step S201 per above, if sliding information of the finger of the user in the sliding process is the change situation of the sliding acceleration of the finger of the user in the sliding process, step S202 includes step S202c and step S202d.

Step S202c: If the sliding acceleration of the finger of the user gradually becomes higher from left to right, identify that an operation mode of the user is a right-hand operation mode.

Step S202d: If the sliding acceleration of the finger of the user gradually becomes lower from left to right, identify that an operation mode of the user is a left-hand operation mode.

Referring to FIG. 5, if sliding information of the finger of the user in the sliding process includes both the change situation of the contact area between the finger of the user and the screen in the sliding process and the change situation of the sliding acceleration of the finger of the user in the sliding process, step S202 includes step S202e, step S202f, step S202g, step S202h, and step S202i.

Step S202e: Set a weight value of the change situation of the contact area between the finger of the user and the screen in the sliding process to w2, and a weight value of the change situation of the sliding acceleration of the finger of the user in the sliding process to w3.

There is no apparent order between step S201 and step S202e.

Step S202f: If the contact area between the finger of the user and the screen gradually becomes smaller from left to right, determine that a probability of a right-hand operation mode of the user increases by the weight value w2, or if the contact area between the finger of the user and the screen gradually becomes larger from left to right, determine that a probability of a left-hand operation mode of the user increases by the weight value w2.

Step S202g: If the sliding acceleration of the finger of the user gradually becomes higher from left to right, determine that the probability of the right-hand operation mode of the user increases by the weight value w3, or if the sliding acceleration of the finger of the user gradually becomes lower from left to right, determine that the probability of the left-hand operation mode of the user increases by the weight value w3.

There is no order between step S202f and step S202g.

Step S202h: Compare magnitudes of the probability of the right-hand operation mode of the user and the probability of the left-hand operation mode of the user.

Step S202i: If the probability of the right-hand operation mode of the user is greater than the probability of the left-hand operation mode of the user, identify that the operation mode of the user is the right-hand operation mode, or if the probability of the right-hand operation mode of the user is less than the probability of the left-hand operation mode of the user, identify that the operation mode of the user is the left-hand operation mode.

Figure 6:
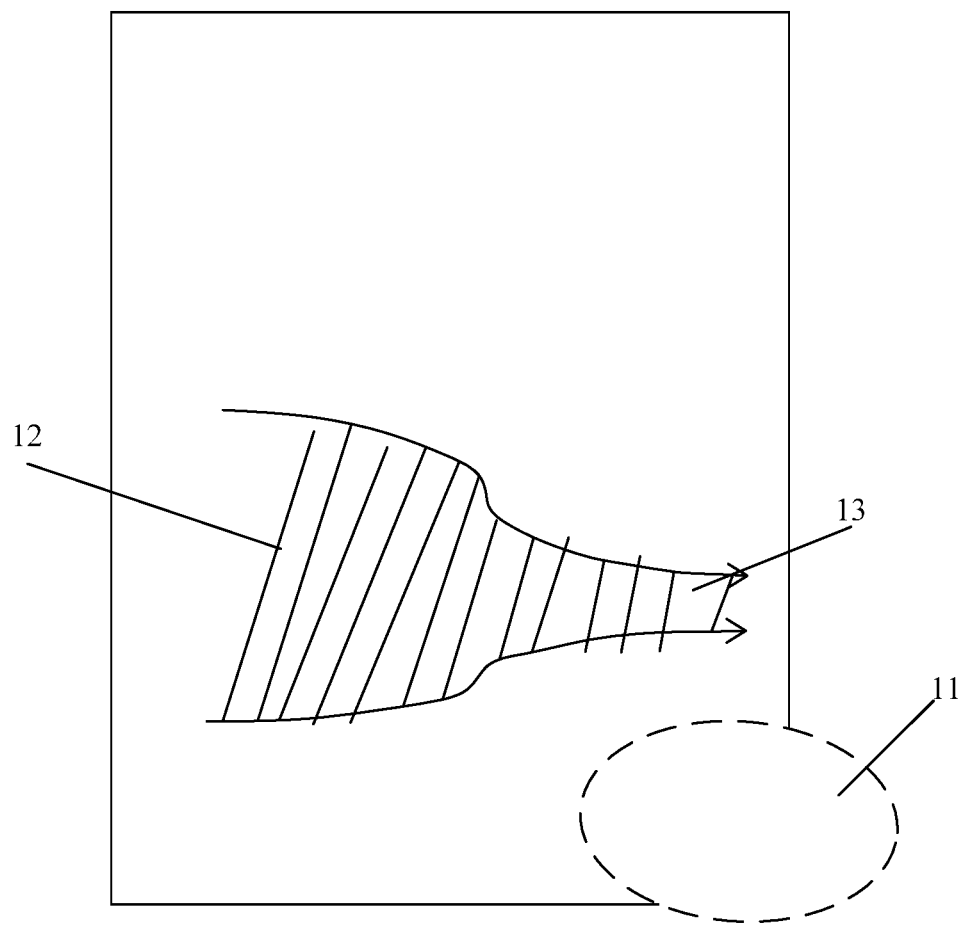
FIG. 6 is a diagram of a principle of a change situation of a contact area between a right finger of a user and a screen in the method for identifying a user operation mode on a handheld device.

When a device is held with a single right hand (that is, in a right-hand operation mode), and when a thumb slides on a screen, a contact area between the finger and the screen gradually becomes smaller from left to right in a process in which the thumb changes from a straight state at a remote end to a bent state. That is, the more the finger tends to be in the straight state, the larger the contact area between the finger and the screen is; the more the finger tends to be in the bent state, the smaller the contact area between the finger and the screen is. A principle is shown in FIG. 6, where 11 is a position at which the device is held with the right hand; 12 is the contact area between the thumb of the right hand in the straight state and the screen; 13 is the contact area between the thumb of the right hand in the bent state and the screen. Under a normal circumstance, when a user slides on the screen, force F of the finger is almost consistent (that is, between touch force of the finger on the screen and sliding force of the finger). However, because the contact area between the finger and the screen gradually becomes smaller from left to right, so that friction force F' between the finger and the screen gradually becomes smaller from left to right along with a change of the area between the finger and the screen. It may be learned, according to a physical formula (F−F')=ma for an acceleration a, that the acceleration a gradually becomes higher from left to right, where m is the mass of the finger.

Figure 7:
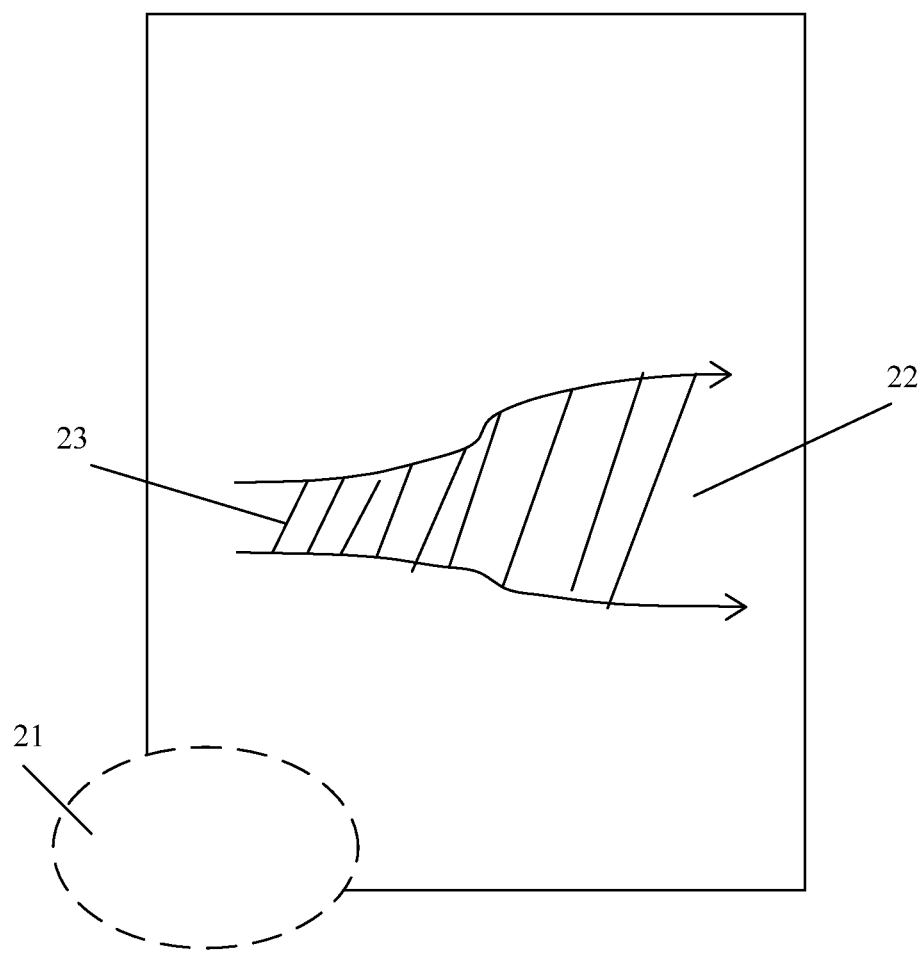
FIG. 7 is a diagram of a principle of a change situation of a contact area between a left finger of a user and a screen in the method for identifying a user operation mode on a handheld device according to the present disclosure.

Likewise, when a device is held with a single left hand (that is, in a left-hand operation mode), and when a thumb slides on a screen, a contact area between the thumb and the screen gradually becomes smaller from right to left (or gradually becomes larger from left to right) in a process in which the thumb changes from a straight state at a remote end to a bent state. A principle is shown in FIG. 7, where 21 is a position at which the device is held with the left hand; 22 is the contact area between the thumb of the left hand in the straight state and the screen; 23 is the contact area between the thumb of the left hand in the bent state and the screen. It may be learned, according to a physical formula (F−F')=ma for an acceleration a, that the acceleration a gradually becomes lower from left to right, where m is the mass of the finger.

Therefore, if the contact area between the finger of the user and the screen gradually becomes smaller from left to right or the sliding acceleration of the finger of the user gradually becomes higher from left to right, it is identified that the operation mode of the user is the right-hand operation mode. If the contact area between the finger of the user and the screen gradually becomes larger from left to right or the sliding acceleration of the finger of the user gradually becomes lower from left to right, it is identified that the operation mode of the user is the left-hand operation mode. If the sliding information of the finger of the user in the sliding process includes both the change situation of the contact area between the finger of the user and the screen in the sliding process and the change situation of the sliding acceleration of the finger of the user in the sliding process, weight values of the two are separately preset. When the contact area between the finger of the user and the screen gradually becomes smaller from left to right, it is determined that a probability of the right-hand operation mode of the user increases by the weight value w2, and if the contact area between the finger of the user and the screen gradually becomes larger from left to right, it is determined that a probability of the left-hand operation mode of the user increases by the weight value w2; if the sliding acceleration of the finger of the user gradually becomes higher from left to right, it is determined that the probability of the right-hand operation mode of the user increases by the weight value w3, or if the sliding acceleration of the finger of the user gradually becomes lower from left to right, it is determined that the probability of the left-hand operation mode of the user increases by the weight value w3. Then, magnitudes of the probability of the right-hand operation mode of the user and the probability of the left-hand operation mode of the user are compared, and the operation mode of the user is identified according to a result of the comparing.

Certainly, in an actual application, a manner in step S202 in which the operation mode of user is identified according to both or either of the change situation of the contact area between the finger of the user and the screen in the sliding process and the change situation of the sliding acceleration of the finger of the user in the sliding process may be another manner. For example, if in the sliding process of the finger, a change situation of the contact area between the finger and the screen and a change situation of the sliding acceleration do not match the foregoing laws, the operation mode of the user may be identified after different laws are acquired.

According to this implementation manner of the present disclosure, both or either of a change situation of a contact area between a finger of a user and a screen in a sliding process and a change situation of a sliding acceleration of the finger of the user in the sliding process are or is acquired, and an operation mode of the user is identified according to both or either of the change situation of the contact area between the finger of the user and the screen in the sliding process and the change situation of the sliding acceleration of the finger of the user in the sliding process. Using this manner can, on the one hand, enrich the manner for identifying whether a device is held by a user with a left hand or a right hand without an additional cost, and on the other hand, increase the accuracy of identification when a user operation mode is identified according to both a change situation of a contact area between a finger of the user and a screen in a sliding process and a change situation of a sliding acceleration of the finger of the user in the sliding process.

Further, in a preferable embodiment, both or either of a change situation of a contact area between a finger and a screen and a change situation of a sliding velocity, when a finger of a user slides to unlock, are or is acquired in a process of sliding to unlock (for example, sliding block unlock or pattern unlock) by the user, and further, an operation mode of the user, that is, whether the user is in a left-hand operation mode or a right-hand operation mode, is identified according to both or either of the change situation of the contact area between the finger and the screen and the change situation of the sliding velocity generated when the finger of the user slides to unlock. In this way, the operation mode of the user may be identified after the user implements an unlock operation, and further a user interface may be immediately switched, before the user performs a next operation, to a form (for example, a form that facilitates a left-hand operation or a form that facilitates a right-hand operation) that matches the operation mode of the user, which further improves user experience.

Figure 8:
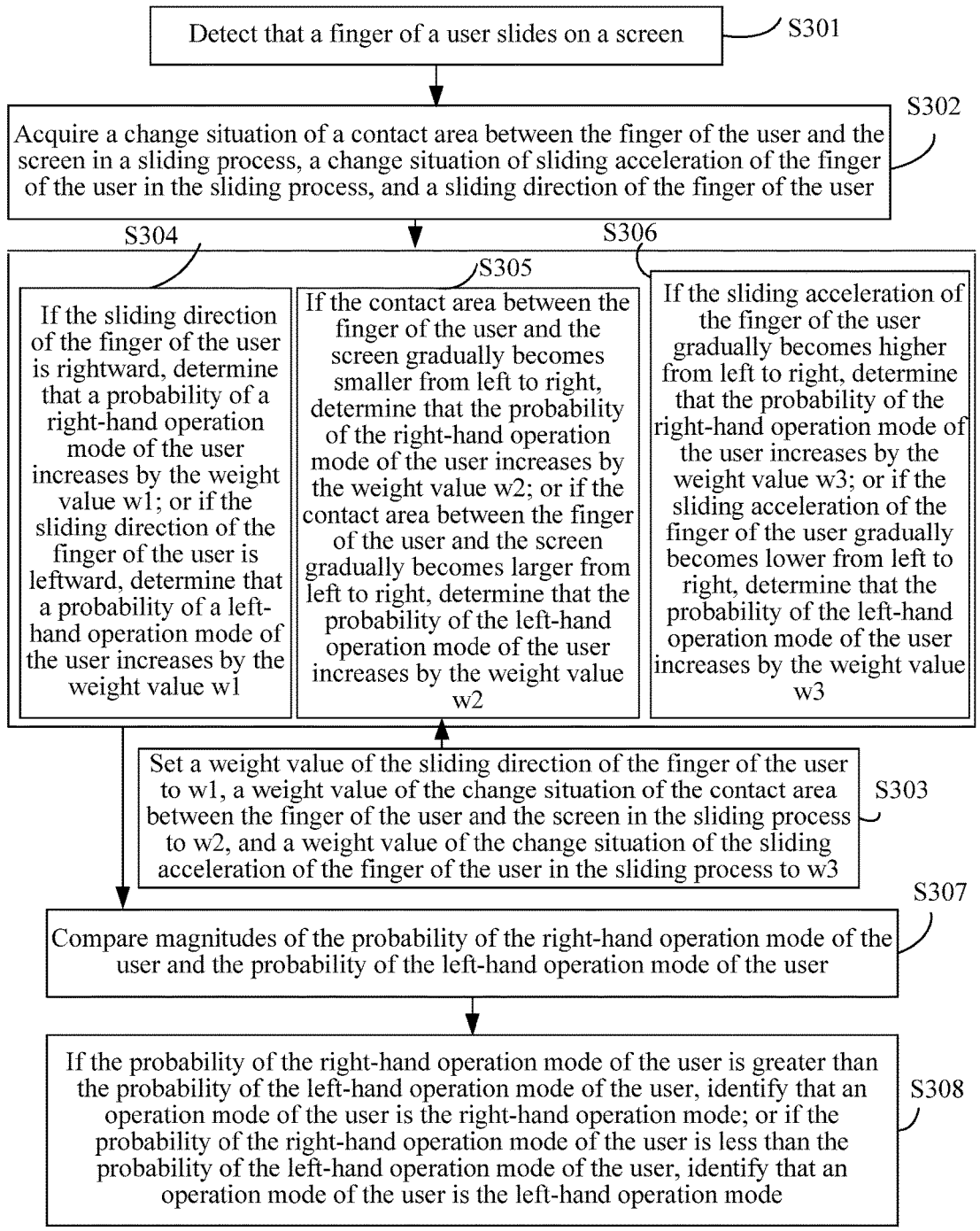
FIG. 8 is a flowchart of still another implementation manner of the method for identifying a user operation mode on a handheld device according to the present disclosure.
Figure 9:
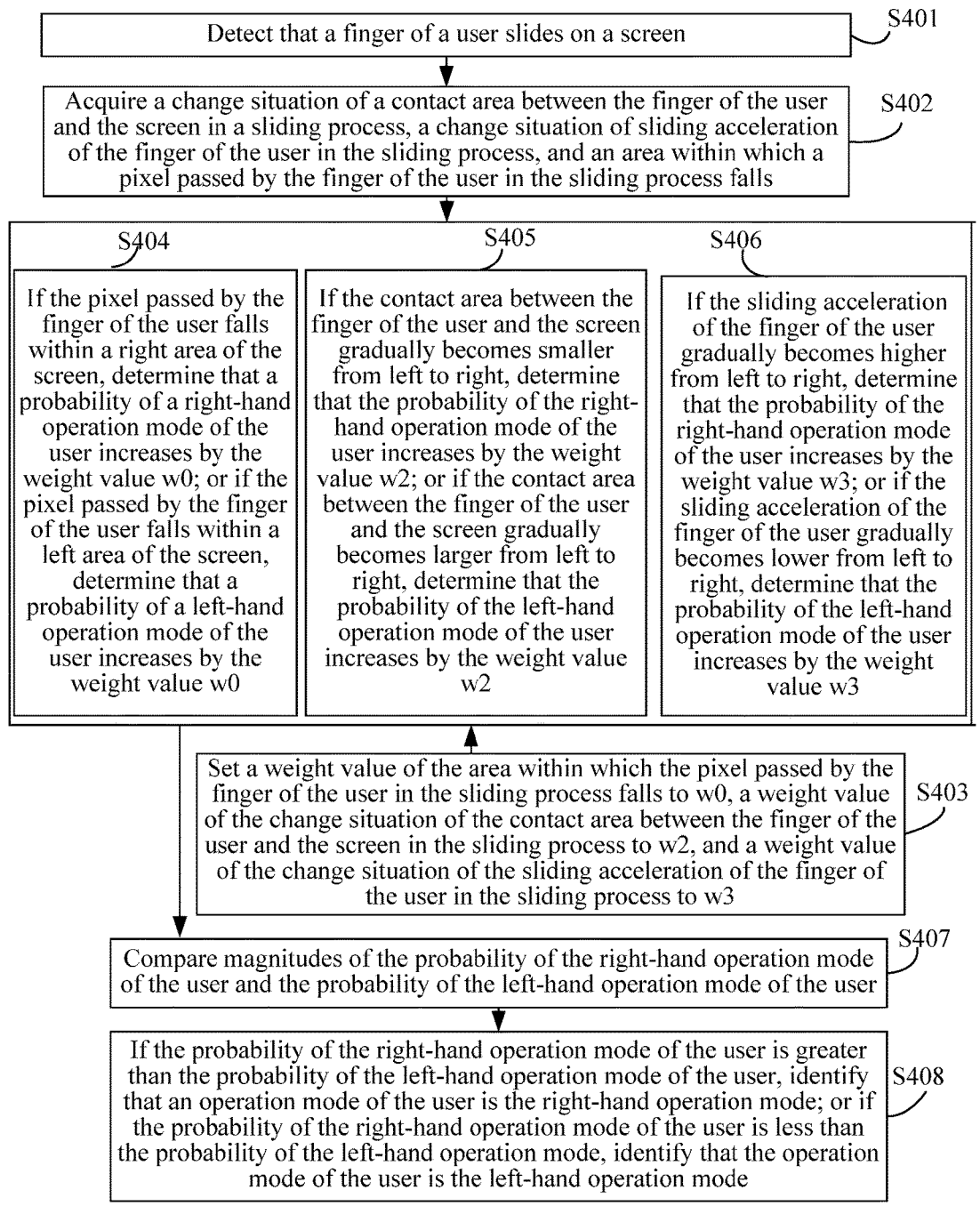
FIG. 9 is a flowchart of still another implementation manner of the method for identifying a user operation mode on a handheld device according to the present disclosure.

Referring to FIG. 8 to FIG. 9, FIG. 8 to FIG. 9 are flowcharts of two implementation manners of a method for identifying a user operation mode on a handheld device according to the present disclosure. Detailed content is as described in the following steps.

Step S301: Detect that a finger of a user slides on a screen.

Step S302: Acquire a change situation of a contact area between the finger of the user and the screen in a sliding process, a change situation of a sliding acceleration of the finger of the user in the sliding process, and a sliding direction of the finger of the user.

The acquiring the sliding direction of the finger of the user includes the following content:

A. acquiring start and end positions of the finger of the user in a sliding track;

B. if in the sliding track, the end position of the finger of the user is on the right side of the start position of the finger of the user, determining that the finger of the user slides rightwards; and C. if in the sliding track, the end position of the finger of the user on the left side of the start position of the finger of the user, determining that the finger of the user slides leftwards.

If the user holds the device with a single hand, the start and end positions of the finger in the sliding track help determine the sliding direction of the finger, and it may also be roughly determined, according to the sliding position of the finger, which hand of the user is holding the device.

Step S303: Set a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3.

Step S304: If the sliding direction of the finger of the user is rightward, determine that a probability of a right-hand operation mode of the user increases by the weight value w1, or if the sliding direction of the finger of the user is leftward, determine that a probability of a left-hand operation mode of the user increases by the weight value w1.

Step S305: If the contact area between the finger of the user and the screen gradually becomes smaller from left to right, determine that the probability of the right-hand operation mode of the user increases by the weight value w2, or if the contact area between the finger of the user and the screen gradually becomes larger from left to right, determine that the probability of the left-hand operation mode of the user increases by the weight value w2.

Step S306: If the sliding acceleration of the finger of the user gradually becomes higher from left to right, determine that the probability of the right-hand operation mode of the user increases by the weight value w3, or if the sliding acceleration of the finger of the user gradually becomes lower from left to right, determine that the probability of the left-hand operation mode of the user increases by the weight value w3.

There is no order among step S304, step S305, and step S306.

Step S307: Compare magnitudes of the probability of the right-hand operation mode of the user and the probability of the left-hand operation mode of the user.

Step S308: If the probability of the right-hand operation mode of the user is greater than the probability of the left-hand operation mode of the user, identify that an operation mode of the user is the right-hand operation mode, or if the probability of the right-hand operation mode of the user is less than the probability of the left-hand operation mode of the user, identify that an operation mode of the user is the left-hand operation mode.

Referring to FIG. 9, in an implementation manner in FIG. 9, sliding information of a finger of a user in a sliding process includes a change situation of a contact area between the finger of the user and a screen in the sliding process, a change situation of a sliding acceleration of the finger of the user in the sliding process, and an area within which a pixel passed by the finger of the user in the sliding process falls. Detailed content is as described in the following steps.

Step S401: Detect that the finger of the user slides on the screen.

Step S402: Acquire the change situation of the contact area between the finger of the user and the screen in the sliding process, the change situation of the sliding acceleration of finger of the user in the sliding process, and the area within which the pixel passed by the finger of the user in the sliding process falls.

Step S403: Set a weight value of the area within which the pixel passed by the finger of the user in the sliding process falls to w0, a weight value of the change situation of the contact area between the finger of the user and the screen in the sliding process to w2, and a weight value of the change situation of the sliding acceleration of the finger of the user in the sliding process to w3.

Step S404: If the pixel passed by the finger of the user falls within a right area of the screen, determine that a probability of a right-hand operation mode of the user increases by the weight value w0, or if the pixel passed by the finger of the user falls within a left area of the screen, determine that a probability of a left-hand operation mode of the user increases by the weight value w0.

When the user holds a device with a single hand, a range for activities of the finger is limited. Pixels passed by in the sliding process are basically concentrated in one area, and the pixels passed by in the sliding process are basically concentrated in an area that is close to the hand that holds the device. Therefore, it may be roughly determined, according to the area within which the pixel passed by the finger of the user in the sliding process falls, which hand of the user is holding the device.

Step S405: If the contact area between the finger of the user and the screen gradually becomes smaller from left to right, determine that the probability of the right-hand operation mode of the user increases by the weight value w2, or if the contact area between the finger of the user and the screen gradually becomes larger from left to right, determine that the probability of the left-hand operation mode of the user increases by the weight value w2.

Step S406: If the sliding acceleration of the finger of the user gradually becomes higher from left to right, determine that the probability of the right-hand operation mode of the user increases by the weight value w3, or if the sliding acceleration of the finger of the user gradually becomes lower from left to right, determine that the probability of the left-hand operation mode of the user increases by the weight value w3.

There is no order among step S404, step S405, and step S406.

Step S407: Compare magnitudes of the probability of the right-hand operation mode of the user and the probability of the left-hand operation mode of the user.

Step S408: If the probability of the right-hand operation mode of the user is greater than the probability of the left-hand operation mode of the user, identify that an operation mode of the user is the right-hand operation mode, or if the probability of the right-hand operation mode of the user is less than the probability of the left-hand operation mode of the user, identify that an operation mode of the user is the left-hand operation mode.

When it is detected that a finger of a user slides on a screen, four parameters may be acquired: an area within which a pixel passed by the finger of the user in a sliding process falls, a sliding direction of the finger of the user, a change situation of a contact area between the finger of the user and the screen in the sliding process, and a change situation of a sliding acceleration of the finger of the user in the sliding process. According to an actual application situation, some parameters of the four parameters may be acquired to comprehensively identify a probability that a device is held with a left hand or a right hand, and more parameters acquired indicates higher accuracy of identification. In the foregoing implementation manner, some combinations of the four parameters are selected, and other combinations are not described in detail herein.

In the foregoing implementation manner, an action of the finger of the user on the screen is an action of unlocking the screen. Using this manner, whether a device is held with a left hand or a right hand is identified rapidly and more accurately in a case in which no additional action of the user is needed. Furthermore, a result of the identification is applied to an entire unlocked period following unlocking.

In addition, in an actual application of the foregoing implementation manner, if the four parameters are all acquired, a specific application process is as follows.

First, a weight value of the area within which the pixel passed by the finger of the user in the sliding process falls is set to w0; a weight value of the sliding direction of the finger of the user is set to w1; a weight value of the change situation of the contact area between the finger of the user and the screen in the sliding process is set to w2; a weight value of the change situation of the sliding acceleration of the finger of the user in the sliding process is set to w3.

Second, when the four parameters (the area within which the pixel passed by the finger of the user in the sliding process falls, the sliding direction of the finger of the user, the change situation of the contact area between the finger of the user and the screen in the sliding process, and the change situation of the sliding acceleration of the finger of the user in the sliding process) are acquired, if the pixel passed by the finger of the user falls within the right area of the screen, it is determined that the probability of the right-hand operation mode of the user increases by the weight value w0; or if the pixel passed by the finger of the user falls within the left area of the screen, it is determined that the probability of the left-hand operation mode of the user increases by the weight value w0; if the sliding direction of the finger of the user is rightward, it is determined that the probability of the right-hand operation mode of the user increases by the weight value w1; or if the sliding direction of the finger of the user is leftward, it is determined that the probability of the left-hand operation mode of the user increases by the weight value w1; if the contact area between the finger of the user and the screen gradually becomes smaller from left to right, it is determined that the probability of the right-hand operation mode of the user increases by the weight value w2; or if the contact area between the finger of the user and the screen gradually becomes larger from left to right, it is determined that the probability of the left-hand operation mode of the user increases by the weight value w2; and if the sliding acceleration of the finger of the user gradually becomes higher from left to right, it is determined that the probability of the right-hand operation mode of the user increases by the weight value w3; or if the sliding acceleration of the finger of the user gradually becomes lower from left to right, it is determined that the probability of the left-hand operation mode of the user increases by the weight value w3.

Third, magnitudes of the probability of the right-hand operation mode of the user and the probability of the left-hand operation mode of the user are compared.

If the probability of the right-hand operation mode of the user is greater than the probability of the left-hand operation mode of the user, it is identified that the operation mode of the user is the right-hand operation mode; or if the probability of the right-hand operation mode of the user is less than the probability of the left-hand operation mode of the user, it is identified that the operation mode of the user is the left-hand operation mode.

For example, the probability of the right-hand operation mode is w0+w2+w3, the probability of the left-hand operation mode is w1, and w0+w2+w3 and w1 are compared; if w0+w2+w3 is greater than w1, it is identified that the operation mode of the user is the right-hand operation mode.

The weight values w0, w1, w2, and w3 are set according to a size of the screen and a sliding length and shape of the finger of the user on the screen.

Figure 10:
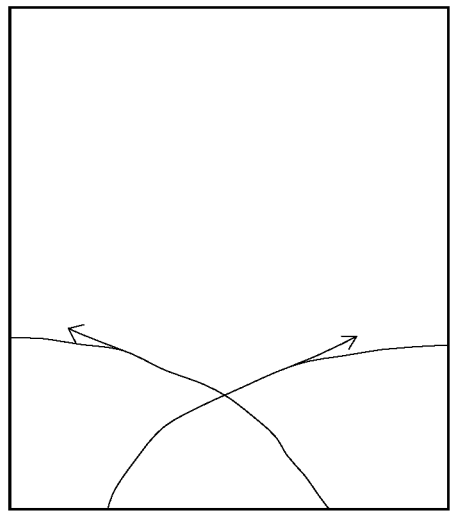
FIG. 10 is a schematic diagram of sliding to unlock in the method for identifying a user operation mode on a handheld device according to the present disclosure.

For example, when a screen of a mobile phone is relatively large and a user holds the mobile phone with a single hand, it is quite difficult for a thumb to approach a bezel position on an opposite side (that is, a left hand reaches a right bezel, and a right hand reaches a left bezel). If a method for unlocking by horizontally sliding a distance is designed, as shown in FIG. 10 to enable the user to slide to unlock by horizontally drawing a circle on the screen, it is apparently more effective to determine the operation mode of the user using the area within which the pixel passed by the finger in the sliding process falls, and in this case, the weight value w0 needs to be increased. In this case, weight values may be w0>w2>w1>w3.

Figure 11:
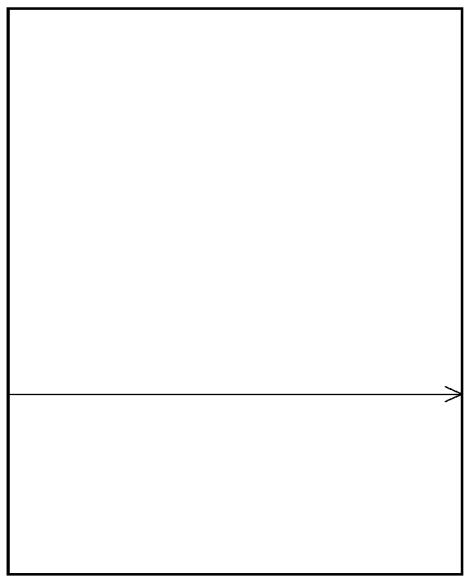
FIG. 11 is another schematic diagram of sliding to unlock in the method for identifying a user operation mode on a handheld device according to the present disclosure.

If the screen is of a medium size (that is, thumbs of both hands can reach bezels at opposite sides), for example, an unlocking manner shown in FIG. 11 is designed, the weight values need to be adjusted to w2>w1>w3>w0. Because two ends of an unlock pattern in FIG. 11 are completely symmetrical, it is determined that the weight value w0 of the area within which the pixel passed by the finger in the sliding process falls may be completely ignored and not used (that is, the weight value w0 is 0).

Therefore, not all the foregoing four parameters need to be used simultaneously, and only some parameters of the four parameters may be used according to a size of the screen and a design of a sliding shape for unlocking.

Figure 12:
FIG. 12 is still another schematic diagram of sliding to unlock in the method for identifying a user operation mode on a handheld device according to the present disclosure.

For another example, for a mobile or a tablet computer with a larger screen, an unlocking method may be designed. As shown in FIG. 12, when an unlock interface is designed, a sliding area for unlocking may be designed at two lower corners, that is, a left lower corner and a right lower corner, and a thumb of a single hand cannot reach an area on an opposite side. In this relatively extreme situation, accurate determination may be acquired by only using the weight value w0 of the area within which the finger falls on the screen during sliding as a determining basis.

According to this implementation manner of the present disclosure, both or either of a change situation of a contact area between a finger of a user and a screen in a sliding process and a change situation of a sliding acceleration of the finger of the user in the sliding process are or is acquired, and an operation mode of the user is identified according to both or either of the change situation of the contact area between the finger of the user and the screen in the sliding process and the change situation of the sliding acceleration of the finger of the user in the sliding process. Using this manner can, on the one hand, enrich the manner for identifying a user operation mode without any additional cost, and on the other hand, increase the accuracy of identification when a user operation mode is identified according to both a change situation of a contact area between a finger of the user and a screen in a sliding process and a change situation of a sliding acceleration of the finger of the user in the sliding process. In addition, the accuracy of identification can further be improved with reference to parameters of an area within which a pixel passed by the finger of the user in the sliding process falls and a sliding direction of the finger of the user, and a sliding action of the finger of the user is an action of unlocking the screen, which can rapidly and more accurately identifies a mode of holding a device with a left hand or a right hand in a case in which no additional action of the user is needed. Furthermore, a result of the identification is applied to an entire unlocked period following unlocking.

Figure 13:
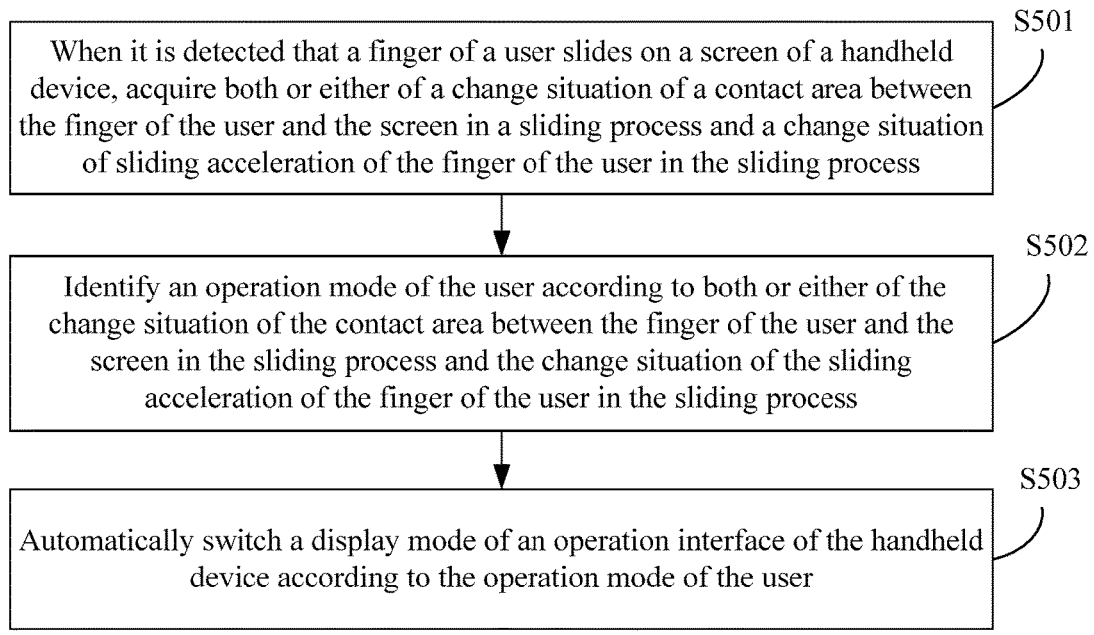
FIG. 13 is a flowchart of still another implementation manner of the method for identifying a user operation mode on a handheld device according to the present disclosure.

Referring to FIG. 13, FIG. 13 is a flowchart of still another implementation manner of a method for identifying a user operation mode on a handheld device according to the present disclosure, including the following steps.

Step S501: When it is detected that a finger of a user slides on a screen of a handheld device, acquire both or either of a change situation of a contact area between the finger of the user and the screen in a sliding process and a change situation of a sliding acceleration of the finger of the user in the sliding process.

Step S502: Identify an operation mode of the user according to both or either of the change situation of the contact area between the finger of the user and the screen in the sliding process and the change situation of the sliding acceleration of the finger of the user in the sliding process.

Step S503: Automatically switch a display mode of an operation interface of the handheld device according to the operation mode of the user.

A hand that has a high probability of holding the device is determined as a hand that holds the device. After a result of the determining is acquired, the display mode of the operation interface is automatically switched, where the display mode of the operation interface includes a left-hand display mode and a right-hand display mode. In the left-hand display mode, the operation interface is generally displayed in a slightly left area of the screen, so as to facilitate an operation with a left hand of the user; in the right-hand display mode, the operation interface is generally displayed in a slightly right area of the screen, so as to facilitate an operation with a right hand of the user. That is, the left-hand display mode matches the left-hand operation mode, and the right-hand display mode matches the right-hand operation mode. In addition, if a sliding action of the user on the screen is an unlock action, a switched display mode is applied in an entire unlocked period following unlocking.

According to this implementation manner of the present disclosure, both or either of a change situation of a contact area between a finger of a user and a screen in a sliding process and a change situation of a sliding acceleration of the finger of the user in the sliding process are or is acquired, and an operation mode of the user is identified according to both or either of the change situation of the contact area between the finger of the user and the screen in the sliding process and the change situation of the sliding acceleration of the finger of the user in the sliding process; an operation interface is automatically switched, according to the operation mode of the user, to a display mode matched the operation mode of the user. Using this manner can, on the one hand, enrich the manner for identifying a user operation mode without an additional cost, and on the other hand, increase the accuracy of identification when a user operation mode is identified according to both a change situation of a contact area between a finger of the user and a screen in a sliding process and a change situation of a sliding acceleration of the finger of the user in the sliding process, so that a display mode of an operation interface is more accurate.

Figure 14:
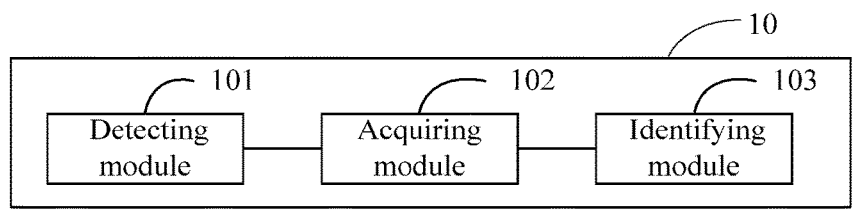
FIG. 14 is a schematic structural diagram of an implementation manner of a handheld device according to the present disclosure.

Referring to FIG. 14, FIG. 14 is a schematic structural diagram of an implementation manner of a handheld device according to the present disclosure, and the handheld device 10 includes a detecting module 101, an acquiring module 102, and an identifying module 103.

It should be noted that, the handheld device in this implementation manner may perform the steps in FIG. 2.

The detecting module 101 is configured to detect whether a finger of a user slides on a screen of the handheld device.

The acquiring module 102 is configured to, when the detecting module 101 detects that the finger of the user slides on the screen of the handheld device, acquire sliding information of the finger of the user in a sliding process.

The identifying module 103 is configured to identify an operation mode of the user according to the sliding information, acquired by the acquiring module 102, of the finger of the user in the sliding process, where the operation mode includes a left-hand operation mode and a right-hand operation mode.

When the finger of the user slides on the screen of the handheld device, a large amount of sliding information is generated, and acquiring the sliding information helps identify the operation mode of the user. Therefore, the operation mode of the user may be identified according to only the sliding information of the finger of the user in the sliding process. The operation mode includes the left-hand operation mode and the right-hand operation mode, where the left-hand operation mode is a mode in which the handheld device is operated with a left hand, and the right-hand operation mode is a mode in which the handheld device is operated with a right hand.

Because the sliding information is naturally generated when the finger of the user slides on the screen of the handheld device, the operation mode of the user may be identified using the sliding information, without additionally using another sensor, as long as the sliding information is captured or collected, which reduces a cost of the handheld device. In addition, the sliding information generated by the finger of the user in the sliding process generally includes a large amount of related sliding information, and comprehensive consideration of the sliding information helps improve accuracy of identification.

According to this implementation manner of the present disclosure, when it is detected that a finger of a user slides on a screen of a handheld device, sliding information of the finger of the user in a sliding process is acquired; an operation mode of the user is identified according to the sliding information of the finger of the user in the sliding process. Using this manner can reduce the cost of a handheld device and improve the accuracy of identification when a user operation mode is identified.

Referring to FIG. 15 to FIG. 19, FIG. 15 to FIG. 19 are schematic structural diagrams of five implementation manners of a handheld device according to the present disclosure, where the handheld device 20 includes a detecting module 201, an acquiring module 202, and an identifying module 203.

It should be noted that, the handheld device in this implementation manner may perform the steps in FIG. 3, FIG. 4, FIG. 5, FIG. 8, and FIG. 9.

The detecting module 201 is configured to detect whether a finger of a user slides on a screen of the handheld device.

The acquiring module 202 is configured to, when the detecting module 201 detects that the finger of the user slides on the screen of the handheld device, acquire sliding information of the finger of the user in a sliding process.

The identifying module 203 is configured to identify an operation mode of the user according to the sliding information, acquired by the acquiring module 202, of the finger of the user in the sliding process, where the operation mode includes a left-hand operation mode and a right-hand operation mode.

The sliding information of the finger of the user in the sliding process includes both or either of a change situation of a contact area between the finger of the user and the screen in the sliding process and a change situation of a sliding acceleration of the finger of the user in the sliding process.

When the finger of the user slides on the screen, the contact area between the finger and the screen continuously changes, and the sliding acceleration of the finger also continuously changes. The change situation of the contact area between the finger and the screen is acquired, or the change situation of the sliding acceleration of the finger is acquired, or the change situation of the contact area between the finger and the screen and the change situation of the sliding acceleration of the finger are acquired.

The identifying module 203 is configured to identify the operation mode of the user according to both or either of the change situation of the contact area between the finger of the user and the screen in the sliding process and the change situation of the sliding acceleration of the finger of the user in the sliding process that are acquired by the acquiring module 202.

When a left-hand finger and a right-hand finger slide on the screen, change laws are different between the left hand and the right hand in terms of the change situation of the contact area between the finger and the screen and the change situation of the sliding acceleration of the finger. Therefore, the operation mode of the user may be identified according to both or either of the change situation of the contact area between the finger and the screen and the change situation of the sliding acceleration of the finger.

Figure 15:
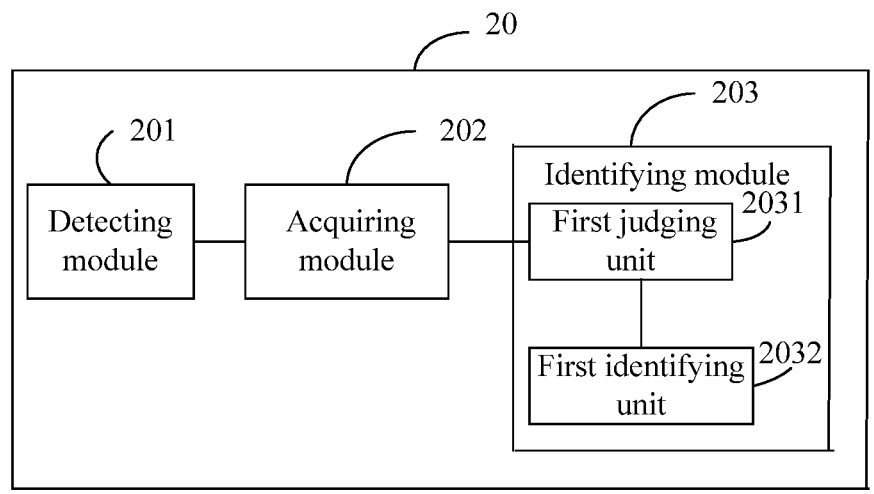
FIG. 15 is a schematic structural diagram of another implementation manner of the handheld device according to the present disclosure.

Referring to FIG. 15, if the sliding information of the finger of the user in the sliding process is the change situation of the contact area between the finger of the user and the screen in the sliding process, the identifying module 203 includes a first judging unit 2031 and a first identifying unit 2032.

The first judging unit 2031 is configured to determine whether the contact area between the finger of the user and the screen gradually becomes smaller from left to right.

The first identifying unit 2032 is configured to, when a result of the determining by the first judging unit 2031 is that the contact area between the finger of the user and the screen gradually becomes smaller from left to right, identify that the operation mode of the user is the right-hand operation mode.

The first identifying unit 2032 is further configured to, when a result of the determining by the first judging unit 2031 is that the contact area between the finger of the user and the screen gradually becomes larger from left to right, identify that the operation mode of the user is the left-hand operation mode.

Figure 16:
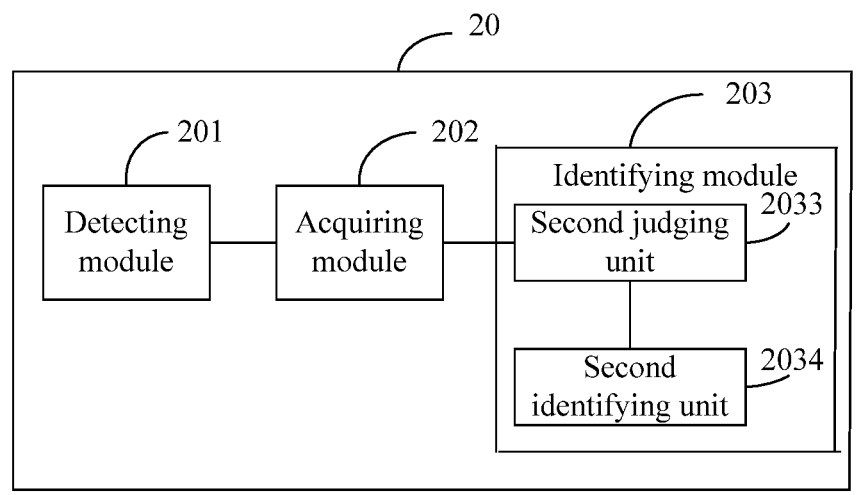
FIG. 16 is a schematic structural diagram of still another implementation manner of the handheld device according to the present disclosure.

Referring to FIG. 16, if the sliding information of the finger of the user in the sliding process is the change situation of the sliding acceleration of the finger of the user in the sliding process, the identifying module 203 includes a second judging unit 2033 and a second identifying unit 2034.

The second judging unit 2033 is configured to determine whether the sliding acceleration of the finger of the user gradually becomes higher from left to right.

The second identifying unit 2034 is configured to, when a result of the determining by the second judging unit 2033 is that the sliding acceleration of the finger of the user gradually becomes higher from left to right, identify that the operation mode of the user is the right-hand operation mode.

The second identifying unit 2034 is further configured to, when a result of the determining by the second judging unit 2033 is that the sliding acceleration of the finger of the user gradually becomes lower from left to right, identify that the operation mode of the user is the left-hand operation mode.

Figure 17:
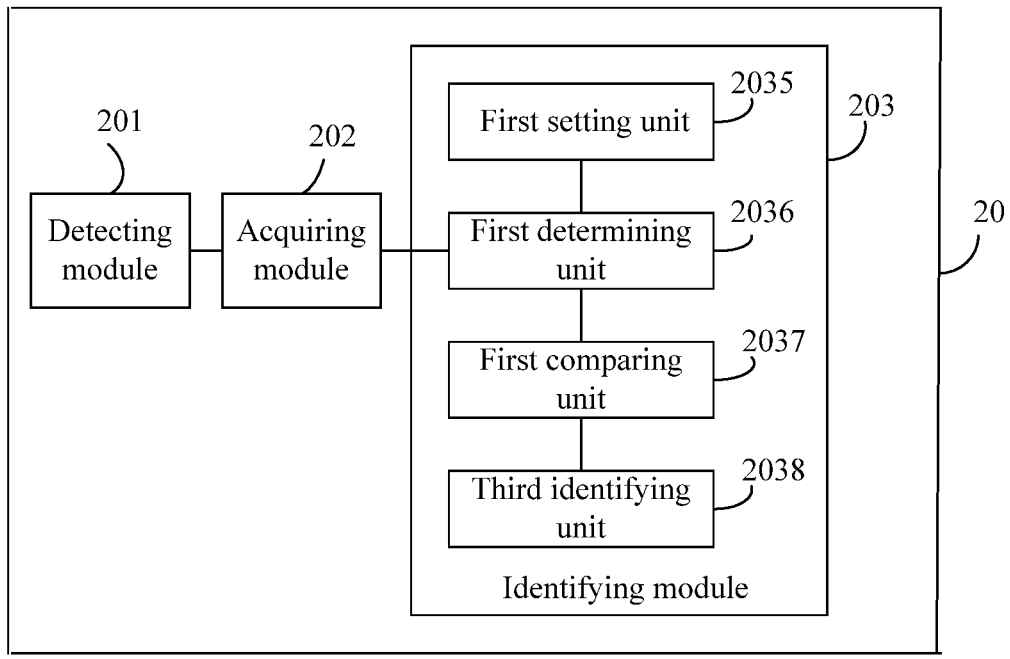
FIG. 17 is a schematic structural diagram of still another implementation manner of the handheld device according to the present disclosure.

Referring to FIG. 17, if the sliding information of the finger of the user in the sliding process includes both the change situation of the contact area between the finger of the user and the screen in the sliding process and the screen in the sliding process and the change situation of the sliding acceleration of the finger of the user in the sliding process, the identifying module 203 includes a first setting unit 2035, a first determining unit 2036, a first comparing unit 2037, and a third identifying unit 2038.

The first setting unit 2035 is configured to set a weight value of the change situation of the contact area between the finger of the user and the screen in the sliding process to w2, and a weight value of the change situation of the sliding acceleration of the finger of the user in the sliding process to w3.

The first determining unit 2036 is configured to, when the contact area between the finger of the user and the screen gradually becomes smaller from left to right, determine that a probability of the right-hand operation mode of the user increases by the weight value w2; or when the contact area between the finger of the user and the screen gradually becomes larger from left to right, determine that a probability of the left-hand operation mode of the user increases by the weight value w2.

The first determining unit 2036 is further configured to, when the sliding acceleration of the finger of the user gradually becomes higher from left to right, determine that the probability of the right-hand operation mode of the user increases by the weight value w3; or when the sliding acceleration of the finger of the user gradually becomes lower from left to right, determine that the probability of the left-hand operation mode of the user increases by the weight value w3.

The first comparing unit 2037 is configured to compare magnitudes of the probability of the right-hand operation mode of the user and the probability of the left-hand operation mode of the user.

The third identifying unit 2038 is configured to, when a result of the comparing by the first comparing unit is that the probability of the right-hand operation mode of the user is greater than the probability of the left-hand operation mode of the user, identify that the operation mode of the user is the right-hand operation mode; or when a result of the comparing by the first comparing unit is that the probability of the right-hand operation mode of the user is less than the probability of the left-hand operation mode of the user, identify that the operation mode of the user is the left-hand operation mode.

According to this implementation manner of the present disclosure, both or either of a change situation of a contact area between a finger of a user and a screen in a sliding process and a change situation of a sliding acceleration of the finger of the user in the sliding process are or is acquired, and an operation mode of the user is identified according to both or either of the change situation of the contact area between the finger of the user and the screen in the sliding process and the change situation of the sliding acceleration of the finger of the user in the sliding process. Using this manner can, on the one hand, enrich the manner for identifying whether a device is held by a user with a left hand or a right hand without an additional cost, and on the other hand, increase the accuracy of identification when a user operation mode is identified according to both a change situation of a contact area between a finger of the user and a screen in a sliding process and a change situation of a sliding acceleration of the finger of the user in the sliding process.

Further, in a preferable embodiment, both or either of a change situation of a contact area between a finger and a screen and a change situation of a sliding velocity, when a finger of a user slides to unlock, are or is acquired in a process of sliding to unlock (for example, sliding block unlock or pattern unlock) by the user, and further, an operation mode of the user, that is, whether the user is in a left-hand operation mode or a right-hand operation mode, is identified according to both or either of the change situation of the contact area between the finger and the screen and the change situation of the sliding velocity generated when the user slides to unlock. In this way, the operation mode of the user may be identified after the user implements an unlock operation, and further a user interface may be immediately switched, before the user performs a next operation, to a form (for example, a form that facilitates a left-hand operation or a form that facilitates a right-hand operation) that matches the operation mode of the user, which further improves user experience.

Figure 18:
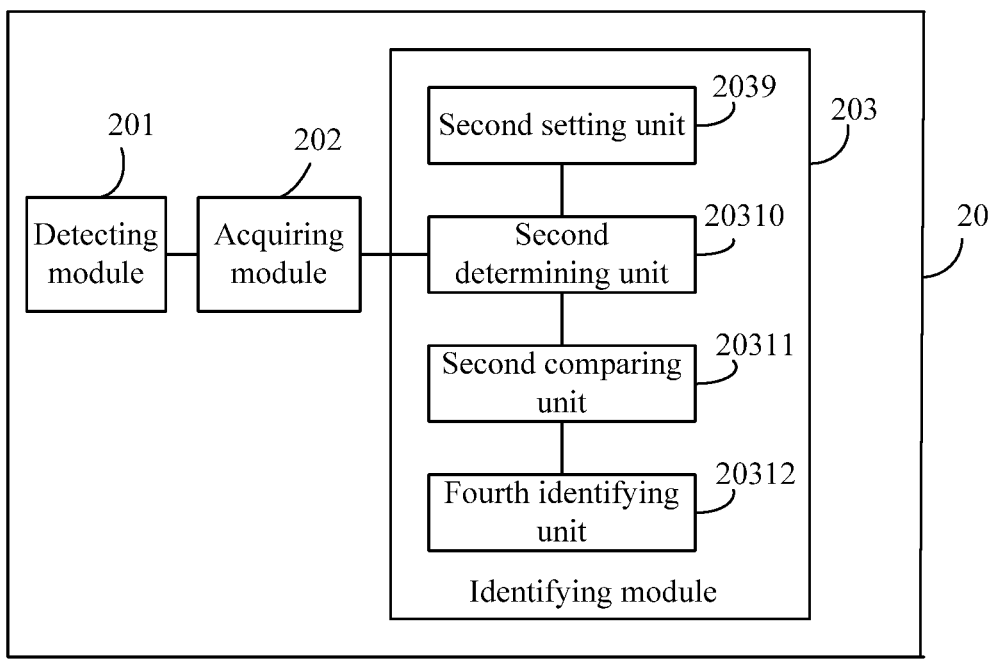
FIG. 18 is a schematic structural diagram of still another implementation manner of the handheld device according to the present disclosure.

Referring to FIG. 18, if the sliding information of the finger of the user in the sliding process includes the change situation of the contact area between the finger of the user and the screen in the sliding process, the change situation of the sliding acceleration of the finger of the user in the sliding process, and a sliding direction of the finger of the user, the identifying module 203 includes a second setting unit 2039, a second determining unit 20310, a second comparing unit 20311, and a fourth identifying unit 20312.

The second setting unit 2039 is configured to set a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3.

The second determining unit 20310 is configured to, when the sliding direction of the finger of the user is rightward, determine that a probability of the right-hand operation mode of the user increases by the weight value w1; or when the sliding direction of the finger of the user is leftward, determine that a probability of the left-hand operation mode of the user increases by the weight value w1.

The second determining unit 20310 is further configured to, when the contact area between the finger of the user and the screen gradually becomes smaller from left to right, determine that the probability of the right-hand operation mode of the user increases by the weight value w2; or when the contact area between the finger of the user and the screen gradually becomes larger from left to right, determine that the probability of the left-hand operation mode of the user increases by the weight value w2.

The second determining unit 20310 is further configured to, when the sliding acceleration of the finger of the user gradually becomes higher from left to right, determine that the probability of the right-hand operation mode of the user increases by the weight value w3; when the sliding acceleration of the finger of the user gradually becomes lower from left to right, determine that the probability of the left-hand operation mode of the user increases by the weight value w3.

The second comparing unit 20311 is configured to compare magnitudes of the probability of the right-hand operation mode of the user and the probability of the left-hand operation mode of the user.

The fourth identifying unit 20312 is configured to, when a result of the comparing by the second comparing unit 20311 is that the probability of the right-hand operation mode of the user is greater than the probability of the left-hand operation mode of the user, identify that the operation mode of the user is the right-hand operation mode; or when a result of the comparing by the second comparing unit 20311 is that the probability of the right-hand operation mode of the user is less than the probability of the left-hand operation mode of the user, identify that the operation mode of the user is the left-hand operation mode.

Figure 19:
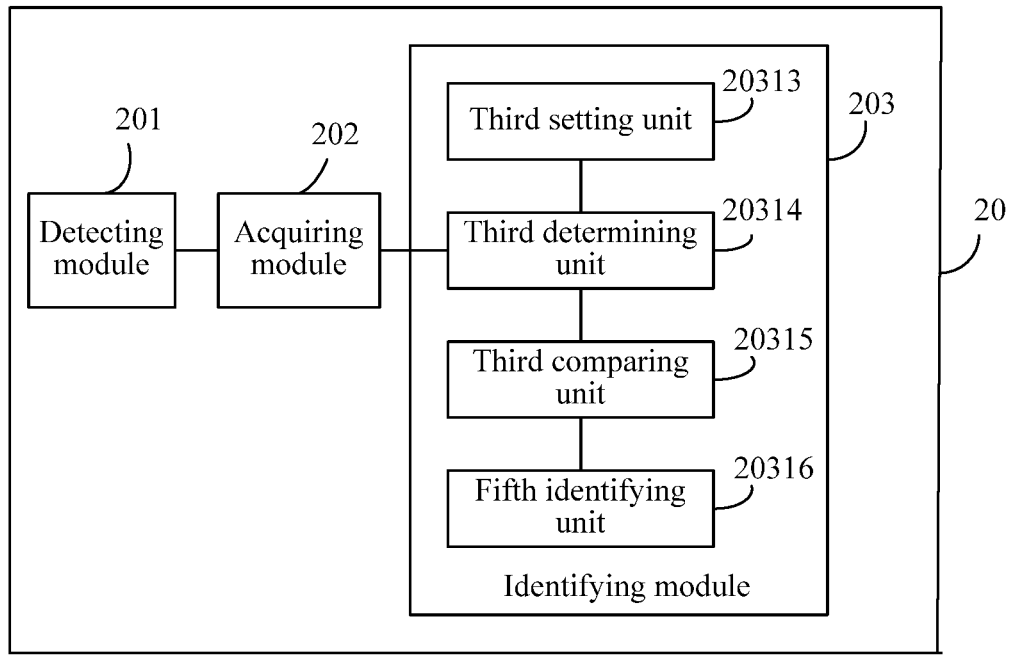
FIG. 19 is a schematic structural diagram of still another implementation manner of the handheld device according to the present disclosure.

Referring to FIG. 19, if the sliding information of the finger of the user in the sliding process includes the change situation of the contact area between the finger of the user and the screen in the sliding process, the change situation of the sliding acceleration of the finger of the user in the sliding process, and an area within which a pixel passed by the finger of the user in the sliding process falls, the identifying module 203 includes a third setting unit 20313, a third determining unit 20314, a third comparing unit 20315, and a fifth identifying unit 20316.

The third setting unit 20313 is configured to set a weight value of the area within which the pixel passed by the finger of the user in the sliding process falls to w0, a weight value of the change situation of the contact area between the finger of the user and the screen in the sliding process to w2, and a weight value of the change situation of the sliding acceleration of the finger of the user in the sliding process to w3.

The third determining unit 20314 is configured to, when the pixel passed by the finger of the user falls within a right area of the screen, determine that a probability of the right-hand operation mode of the user increases by the weight value w0; or when the pixel passed by the finger of the user falls within a left area of the screen, determine that a probability of the left-hand operation mode of the user increases by the weight value w0.

The third determining unit 20314 is further configured to, when the contact area between the finger of the user and the screen gradually becomes smaller from left to right, determine that the probability of the right-hand operation mode of the user increases by the weight value w2; or when the contact area between the finger of the user and the screen gradually becomes larger from left to right, determine that the probability of the left-hand operation mode of the user increases by the weight value w2.

The third determining unit 20314 is further configured to, when the sliding acceleration of the finger of the user gradually becomes higher from left to right, determine that the probability of the right-hand operation mode of the user increases by the weight value w3; or when the sliding acceleration of the finger of the user gradually becomes lower from left to right, determine that the probability of the left-hand operation mode of the user increases by the weight value w3.

The third comparing unit 20315 is configured to compare the magnitudes of the probability of the right-hand operation mode of the user and the probability of the left-hand operation mode of the user.

The fifth identifying unit 20316 is configured to, when a result of the comparing by the third comparing unit 20315 is that the probability of the right-hand operation mode of the user is greater than the probability of the left-hand operation mode of the user, identify that the operation mode of the user is the right-hand operation mode; or when a result of comparing by the third comparing unit 20315 is that the probability of the right-hand operation mode of the user is less than the probability of the left-hand operation mode of the user, identify that the operation mode of the user is the left-hand operation mode.

When it is detected that a finger of a user slides on a screen, four parameters may be acquired: an area within which a pixel passed by the finger of the user in a sliding process falls, a sliding direction of the finger of the user, a change situation of a contact area between the finger of the user and the screen in the sliding process, and a change situation of a sliding acceleration of the finger of the user in the sliding process. According to an actual application situation, some parameters of the four parameters may be acquired to comprehensively identify a probability that a device is held with a left hand or a right hand, and more parameters acquired indicates higher accuracy of identification. In the foregoing implementation manner, some combinations of the four parameters are selected, and other combinations are not described in detail herein again.

In the foregoing implementation manner, an action of the finger of the user on the screen is an action of unlocking the screen. Using this manner, whether a device is held with a left hand or a right hand is identified rapidly and more accurately in a case in which no additional action of the user is needed. Furthermore, a result of the identification is applied to an entire unlocked period following unlocking.

In addition, in an actual application of the foregoing implementation manner, if the four parameters are all acquired, the identifying module includes a fourth setting unit, a fourth determining unit, a fourth comparing unit, and a sixth identifying unit.

The fourth setting unit is configured to set a weight value of the area within which the pixel passed by the finger of the user in the sliding process falls to w0, a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3.

The fourth determining unit is configured to, when the pixel passed by the finger of the user falls within a right area of the screen, determine that a probability of the right-hand operation mode of the user increases by the weight value w0;

or when the pixel passed by the finger of the user falls within a left area of the screen, determine that a probability of the left-hand operation mode of the user increases by the weight value w0.

The fourth determining unit is further configured to, when the sliding direction of the finger of the user is rightward, determine that the probability of the right-hand operation mode of the user increases by the weight value w1; or when the sliding direction of the finger of the user is leftward, determine that the probability of the left-hand operation mode of the user increases by the weight value w1.

The fourth determining unit is further configured to, when the contact area between the finger of the user and the screen gradually becomes smaller from left to right, determine that the probability of the right-hand operation mode of the user increases by the weight value w2; or when the contact area between the finger of the user and the screen gradually becomes larger from left to right, determine that the probability of the left-hand operation mode of the user increases by the weight value w2.

The fourth determining unit is further configured to, when the sliding acceleration of the finger of the user gradually becomes higher from left to right, determine that the probability of the right-hand operation mode of the user increases by the weight value w3; when the sliding acceleration of the finger of the user gradually becomes lower from left to right, determine that the probability of the left-hand operation mode of the user increases by the weight value w3.

The fourth comparing unit is configured to compare magnitudes of a probability that the device is held with a right hand of the user and a probability that the device is held with a left hand of the user.

If the probability of the right-hand operation mode of the user is greater than the probability of the left-hand operation mode of the user, the right-hand operation mode of the user is identified, or if the probability of the right-hand operation mode of the user is less than the probability of the left-hand operation mode of the user, the left-hand operation mode of the user is identified.

The sixth identifying unit is configured to, when a result of the comparing by the fourth comparing unit is that the probability of the right-hand operation mode of the user is greater than the probability of the left-hand operation mode of the user, identify that the operation mode of the user is the right-hand operation mode; or when a result of the comparing by the fourth comparing unit is that the probability of the right-hand operation mode of the user is less than the probability of the left-hand operation mode of the user, identify that the operation mode of the user is the left-hand operation mode.

The weight values w0, w1, w2, and w3 are set according to a size of the screen and a sliding length and shape of the finger of the user on the screen.

According to this implementation manner of the present disclosure, both or either of a change situation of a contact area between a finger of a user and a screen in a sliding process and a change situation of a sliding acceleration of the finger of the user in the sliding process are or is acquired, and an operation mode of the user is identified according to both or either of the change situation of the contact area between the finger of the user and the screen in the sliding process and the change situation of the sliding acceleration of the finger of the user in the sliding process. Using this manner can, on the one hand, enrich the manner for identifying a user operation mode without an additional cost, and on the other hand, increase the accuracy of identification when a probability of a user operation mode is identified according to both a change situation of a contact area between a finger of the user and a screen in a sliding process and a change situation of a sliding acceleration of the finger of the user in the sliding process. In addition, the accuracy of identification can further be improved with reference to parameters of an area within which a pixel passed by the finger of the user in the sliding process falls and a sliding direction of the finger of the user, and a sliding action of the finger of the user is an action of unlocking the screen, which can rapidly and more accurately identifies a mode of holding a device with a left hand or a right hand in a case in which no additional action of the user is needed. Furthermore, a result of the identification is applied to an entire unlocked period following unlocking.

Figure 20:
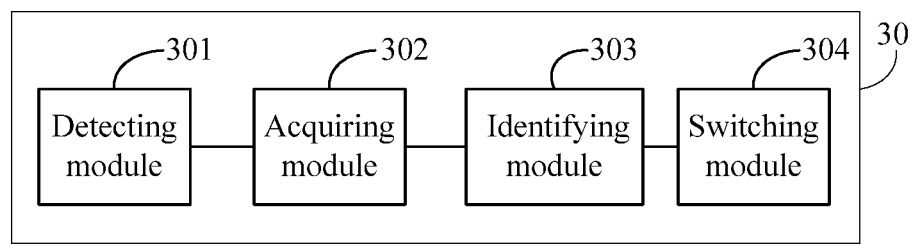
FIG. 20 is a schematic structural diagram of still another implementation manner of the handheld device according to the present disclosure.

Referring to FIG. 20, FIG. 20 is a schematic structural diagram of still another implementation manner of a handheld device according to the present disclosure, where the handheld device 30 includes a detecting module 301, an acquiring module 302, an identifying module 303, and a switching module 304.

It should be noted that, the handheld device in this embodiment may perform the steps in FIG. 13.

The detecting module 301 is configured to detect whether a finger of a user slides on a screen of the handheld device.

The acquiring module 302 is configured to, when the detecting module 301 detects that the finger of the user slides on the screen of the handheld device, acquire both or either of a change situation of a contact area between the finger of the user and the screen in a sliding process and a change situation of a sliding acceleration of the finger of the user in the sliding process.

The identifying module 303 is configured to identify an operation mode of the user according to both or either of the change situation of the contact area between the finger of the user and the screen in the sliding process and the change situation of the sliding acceleration of the finger of the user in the sliding process that are acquired by the acquiring module 302.

The switching module 304 is configured to automatically switch a display mode of an operation interface according to the operation mode of the user identified by the identifying module 303.

According to this embodiment of the present disclosure, both or either of a change situation of a contact area between a finger of a user and a screen in a sliding process and a change situation of a sliding acceleration of the finger of the user in the sliding process are or is acquired; an operation mode of the user is identified according to both or either of the change situation of the contact area between the finger of the user and the screen in the sliding process and the change situation of the sliding acceleration of the finger of the user in the sliding process; a display mode of an operation interface is automatically switched according to the operation mode of the user. Using this manner can, on the one hand, enrich the manner for identifying a user operation mode without an additional cost, and on the other hand, increase the accuracy of identification when a probability of a user operation mode is identified according to both a change situation of a contact area between a finger of the user and a screen in a sliding process and a change situation of a sliding acceleration of the finger of the user in the sliding process, so that a display mode of an operation interface is more accurate.

Figure 21:
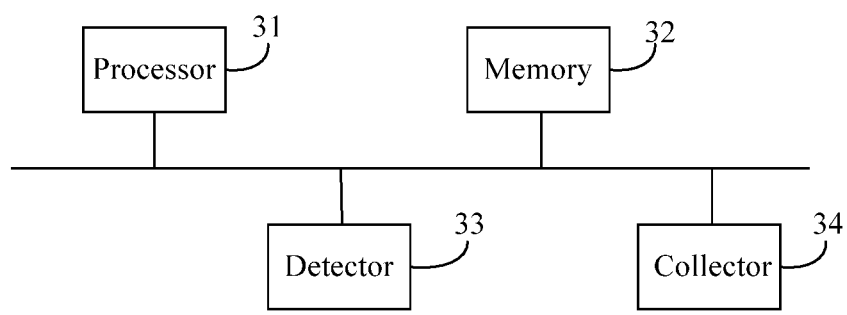
FIG. 21 is a schematic entity structural diagram of an implementation manner of the handheld device according to the present disclosure.

Referring to FIG. 21, FIG. 21 is a schematic entity structural diagram of still another implementation manner of the handheld device according to the present disclosure, where the handheld device includes a processor 31, a memory 32 coupled to the processor 31, a detector 33, and a collector 34.

The detector 33 is configured to detect whether a finger of a user slides on a screen of the handheld device.

The collector 34 is configured to, when the detector 33 detects that the finger of the user slides on the screen of the handheld device, acquire both or either of a change situation of a contact area between the finger of the user and the screen in a sliding process or a change situation of a sliding acceleration of the finger of the user in the sliding process, and store, in the memory 32, both or either of the change situation of the contact area between the finger of the user and the screen in the sliding process and the change situation of the sliding acceleration of the finger of the user in the sliding process.

The processor 31 is configured to extract both or either of the change situation of the contact area between the finger of the user and the screen in the sliding process and the change situation of the sliding acceleration of the finger of the user in the sliding process that are or is stored in the memory 32, and identify an operation mode of the user according to both or either of the change situation of the contact area between the finger of the user and the screen in the sliding process and the change situation of the sliding acceleration of the finger of the user in the sliding process that are or is acquired by the collector 34.

The processor 31 is configured to determine whether the contact area between the finger of the user and the screen gradually becomes smaller from left to right, or whether the sliding acceleration of the finger of the user gradually becomes higher from left to right; and when a result of the determining is that the contact area between the finger of the user and the screen gradually becomes smaller from left to right or that the sliding acceleration of the finger of the user gradually becomes higher from left to right, identify that the operation mode of the user is a right-hand operation mode; or when a result of the determining is that the contact area between the finger of the user and the screen gradually becomes larger from left to right or that the sliding acceleration of the finger of the user gradually becomes lower from left to right, identify that the operation mode of the user is a left-hand operation mode.

The processor 31 is configured to set a weight value of the change situation of the contact area between the finger of the user and the screen in the sliding process to w2, and a weight value of the change situation of the sliding acceleration of the finger of the user in the sliding process to w3; if the contact area between the finger of the user and the screen gradually becomes smaller from left to right, determine that a probability of the right-hand operation mode of the user increases by the weight value w2, or if the contact area between the finger of the user and the screen gradually becomes larger from left to right, determine that a probability of the left-hand operation mode of the user increases by the weight value w2; if the sliding acceleration of the finger of the user gradually becomes higher from left to right, determine that the probability of the right-hand operation mode of the user increases by the weight value w3, or if the sliding acceleration of the finger of the user gradually becomes lower from left to right, determine that the probability of the left-hand operation mode of the user increases by the weight value w3; compare magnitudes of the probability of the right-hand operation mode of the user and the probability of the left-hand operation mode of the user; and if the probability of the right-hand operation mode of the user is greater than the probability of the left-hand operation mode of the user, identify that the operation mode of the user is the right-hand operation mode, or if the probability of the right-hand operation mode of the user is less than the probability of the left-hand operation mode of the user, identify that the operation mode of the user is the left-hand operation mode.

When sliding information of the finger of the user in the sliding process includes the change situation of the contact area between the finger of the user and the screen in the sliding process, the change situation of the sliding acceleration of the finger of the user in the sliding process, and a sliding direction of the finger of the user.

The collector 34 is configured to acquire the change situation of the contact area between the finger of the user and the screen in the sliding process, the change situation of the sliding acceleration of the finger of the user in the sliding process, and the sliding direction of the finger of the user.

The processor 31 is configured to set a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3; if the sliding direction of the finger of the user is rightward, determine that a probability of the right-hand operation mode of the user increases by the weight value w1, or if the sliding direction of the finger of the user is leftward, determine that a probability of the left-hand operation mode of the user increases by the weight value w1; if the contact area between the finger of the user and the screen gradually becomes smaller from left to right, determine that the probability of the right-hand operation mode of the user increases by the weight value w2, or if the contact area between the finger of the user and the screen gradually becomes larger from left to right, determine that the probability of the left-hand operation mode of the user increases by the weight value w2; if the sliding acceleration of the finger of the user gradually becomes higher from left to right, determine that the probability of the right-hand operation mode of the user increases by the weight value w3, or if the sliding acceleration of the finger of the user gradually becomes lower from left to right, determine that the probability of the left-hand operation mode of the user increases by the weight value w3; compare magnitudes of the probability of the right-hand operation mode of the user and the probability of the left-hand operation mode of the user; and if the probability of the right-hand operation mode of the user is greater than the probability of the left-hand operation mode of the user, identify that an operation mode of the user is the right-hand operation mode, or if the probability of the right-hand operation mode of the user is less than the probability of the left-hand operation mode of the user, identify that an operation mode of the user is the left-hand operation mode.

When sliding information of the finger of the user in the sliding process includes the change situation of the contact area between the finger of the user and the screen in the sliding process, the change situation of the sliding acceleration of the finger of the user in the sliding process, and an area within which a pixel passed by the finger of the user in the sliding process falls.

The collector 34 is configured to acquire the change situation of the contact area between the finger of the user and the screen in the sliding process, the change situation of the sliding acceleration of the finger of the user in the sliding process, and the area within which the pixel passed by the finger of the user in the sliding process falls.

The processor 31 is configured to set a weight value of the area within which the pixel passed by the finger of the user in the sliding process falls to w0, a weight value of the change situation of the contact area between the finger of the user and the screen in the sliding process to w2, and a weight value of the change situation of the sliding acceleration of the finger of the user in the sliding process to w3; if the pixel passed by the finger of the user falls within a right area of the screen, determine that a probability of the right-hand operation mode of the user increases by the weight value w0, or if the pixel passed by the finger of the user falls within a left area of the screen, determine that a probability of the left-hand operation mode of the user increases by the weight value w0; if the contact area between the finger of the user and the screen gradually becomes smaller from left to right, determine that the probability of the right-hand operation mode of the user increases by the weight value w2, or if the contact area between the finger of the user and the screen gradually becomes larger from left to right, determine that the probability of the left-hand operation mode of the user increases by the weight value w2; if the sliding acceleration of the finger of the user gradually becomes higher from left to right, determine that the probability of the right-hand operation mode of the user increases by the weight value w3, or if the sliding acceleration of the finger of the user gradually becomes lower from left to right, determine that the probability of the left-hand operation mode of the user increases by the weight value w3; compare magnitudes of the probability of the right-hand operation mode of the user and the probability of the left-hand operation mode of the user; and if the probability of the right-hand operation mode of the user is greater than the probability of the left-hand operation mode of the user, identify that an operation mode of the user is the right-hand operation mode, or if the probability of the right-hand operation mode of the user is less than the probability of the left-hand operation mode of the user, identify that an operation mode of the user is the left-hand operation mode.

The processor 31 is configured to set a weight value of the area within which the pixel passed by the finger of the user in the sliding process falls to w0, a weight value of the sliding direction of the finger of the user to w1, a weight value of the change situation of the contact area between the finger of the user and the screen in the sliding process to w2, and a weight value of the change situation of the sliding acceleration of the finger of the user in the sliding process to w3; when the collector 34 acquires that the pixel passed by the finger of the user falls within a right area of the screen, determine that a probability of the right-hand operation mode of the user increases by the weight value w0, or when the collector 34 acquires that the pixel passed by the finger of the user falls within a left area of the screen, determine that a probability of the left-hand operation mode of the user increases by the weight value w0; when the sliding direction of the finger of the user acquired by the collector 34 is rightward, determine that the probability of the right-hand operation mode of the user increases by the weight value w1, or when the sliding direction of the finger of the user acquired by the collector 34 is leftward, determine that the probability of the left-hand operation mode of the user increases by the weight value w1; when the contact area between the finger of the user and the screen gradually becomes smaller from left to right, determine that the probability of the right-hand operation mode of the user increases by the weight value w2, or when the contact area between the finger of the user and the screen gradually becomes larger from left to right, determine that the probability of the left-hand operation mode of the user increases by the weight value w2; when the sliding acceleration of the finger of the user gradually becomes higher from left to right, determine that the probability of the right-hand operation mode of the user increases by the weight value w3, or when the sliding acceleration of the finger of the user gradually becomes lower from left to right, determine that the probability of the left-hand operation mode of the user increases by the weight value w3; compare magnitudes of the probability of the right-hand operation mode of the user and the probability of the left-hand operation mode of the user; when a result of the comparing is that the probability of the right-hand operation mode of the user is greater than the probability of the left-hand operation mode of the user, identify that an operation mode of the user is the right-hand operation mode, or when a result of the comparing is that the probability of the right-hand operation mode of the user is less than the probability of the left-hand operation mode of the user, identify that an operation mode of the user is the left-hand operation mode.

The weight values w0, w1, w2, and w3 are set according to a size of the screen and a sliding length and shape of the finger of the user on the screen.

A sliding action of the finger of the user on the screen is an action of unlocking the screen.

According to this implementation manner of the present disclosure, both or either of a change situation of a contact area between a finger of a user and a screen in a sliding process and a change situation of a sliding acceleration of the finger of the user in the sliding process are or is acquired, and an operation mode of the user is identified according to both or either of the change situation of the contact area between the finger of the user and the screen in the sliding process and the change situation of the sliding acceleration of the finger of the user in the sliding process. Using this manner can, on the one hand, enrich the manner for identifying a user operation mode without an additional cost, and on the other hand, increase the accuracy of identification when a probability that a device is held with a left hand or a right hand of a user is identified according to both a change situation of a contact area between a finger of the user and a screen in a sliding process and a change situation of a sliding acceleration of the finger of the user in the sliding process. In addition, the accuracy of identification can further be improved with reference to parameters of an area within which a pixel passed by the finger of the user in the sliding process falls and a sliding direction of the finger of the user, and a sliding action of the finger of the user is an action of unlocking the screen, which can rapidly and more accurately identifies a mode of holding a device with a left hand or a right hand in a case in which no additional action of the user is needed. Furthermore, a result of the identification is applied to an entire unlocked period following unlocking.

In the several embodiments provided in the present disclosure, it should be understood that the disclosed system, apparatus, and method may be implemented in other manners. For example, the described apparatus embodiments are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely embodiments of the present disclosure, and are not intended to limit the scope of the present disclosure. An equivalent structural or equivalent process alternation made using the content of the specification and the drawings of the present disclosure, or application of the content of the specification and drawings directly or indirectly to another related technical field, shall fall within the protection scope of the present disclosure.

What is claimed is:

1. A method for identifying a user operation mode on a handheld device comprising a touch screen, comprising:
    acquiring sliding information on the handheld device when a user's finger slides on the touch screen during a sliding process, wherein the sliding information comprises a first change situation and a second change situation, wherein the first change situation comprises a change in a contact area between the user's finger and the touch screen, and wherein the second change situation comprises a change in sliding acceleration of the user's finger on the touch screen;
    assigning a weight value to the first change situation as weight value w2;
    assigning a weight value to the second change situation as weight value w3;
    determining, based on the first change situation, a first probability value of a right-hand operation mode changes by the weight value w2 and a second probability value of a left-hand operation mode changes by the weight value w2;
    determining, based on the second change situation, the first probability value of the right-hand operation mode changes by the weight value w3 and the second probability value of the left-hand operation mode changes by the weight value w3;
    comparing a first magnitude of the first probability value of the right-hand operation mode with a second magnitude of the second probability value of the left-hand operation mode;
    identifying the right-hand operation mode when the first magnitude of the first probability value of the right-hand operation mode is greater than the second magnitude of the second probability value of the left-hand operation mode;
    identifying the left-hand operation mode when the first magnitude of the first probability value of the right-hand operation mode is less than the second magnitude of the second probability value of the left-hand operation mode, wherein the left-hand operation mode is where the handheld device is configured to operate with a left-hand, wherein the right-hand operation mode is where the handheld device is configured to operate with a right-hand; and
    automatically switching a display mode of an application displayed in a user interface of the handheld device to match the left-hand operation mode or the right-hand operation mode in response to identifying the left-hand operation mode or the right-hand operation mode.

2. The method of claim 1, wherein identifying the left-hand operation mode and the right-hand operation mode comprises:
    determining the first probability value of the right-hand operation mode increases by the weight value w2 when the change in the contact area between the user's finger and the touch screen gradually becomes smaller from left to right;
    determining the second probability value of the left-hand operation mode increases by the weight value w2 when the change in the contact area between the user's finger and the touch screen gradually becomes larger from left to right;
    determining the first probability value of the right-hand operation mode changes by the weight value w3 according to the change in the sliding acceleration of the user's finger gradually becomes higher from left to right;
    determining, the second probability value of the left-hand operation mode increases by the weight value w3 when the change in the sliding acceleration of the user finger gradually becomes lower from left to right.

3. The method of claim 1, wherein the sliding information further comprises a sliding direction of the user's finger, and identifying the left-hand operation mode and the right-hand operation mode comprises:
    assigning a weight value of the sliding direction of the user's finger to a weight value w1;
    determining the first probability value of the right-hand operation mode increases by the weight value w1 when the sliding direction of the user's finger is rightward;
    determining the second probability value of the left-hand operation mode increases by the weight value w1 when the sliding direction of the user's finger is leftward;
    determining the first probability value of the right-hand operation mode increases by the weight value w2 when the contact area between the user's finger and the touch screen gradually becomes smaller from left to right;
    determining the second probability value of the left-hand operation mode increases by the weight value w2 when the contact area between the user's finger and the touch screen gradually becomes larger from left to right;
    determining the first probability value of the right-hand operation mode increases by the weight value w3 when the sliding acceleration of the user's finger gradually becomes higher from left to right;

determining the second probability value of the left-hand operation mode increases by the weight value w3 when the sliding acceleration of the user's finger gradually becomes lower from left to right.

4. The method of claim 3, wherein the sliding information further comprises an area within which a pixel passed by the user's finger in the sliding process falls, and wherein identifying the left-hand operation mode and the right-hand operation mode comprises:

assigning a weight value of the area within which the pixel passed by the user's finger in the sliding process falls to the weight value w0;

determining the first probability value of the right-hand operation mode increases by the weight value w0 when the pixel passed by the user's finger falls within a right area of the touch screen;

determining the second probability value of the left-hand operation mode increases by the weight value w0 when the pixel passed by the user's finger falls within a left area of the touch screen.

5. The method of claim 4, wherein the weight value w0, the weight value w1, the weight value w2, and the weight value w3 are assigned according to a size of the touch screen, and a sliding length and shape of the user's finger on the touch screen.

6. The method of claim 1, wherein a sliding action of the user's finger on the touch screen is an action of unlocking the touch screen.

7. A handheld device, comprising:

a touch screen;

a memory configured to store executable instructions;

a processor coupled to the touch screen and the memory, wherein the processor is configured to execute the instructions, which causes the processor to be configured to:

detect whether a user's finger slides on a touch screen of the handheld device;

acquire sliding information on the handheld device e when the user's finger slides on the touch screen during a sliding process, wherein the sliding information comprises a first change situation and a second change situation, wherein the first change situation comprises a change in a contact area between the user's finger and the touch screen, and wherein the second change situation comprises a change in sliding acceleration of the user's finger on the touch screen;

assign a weight value to the first change situation as weight value w2;

assign a weight value of the second change situation as weight value w3;

determine, based on the first change situation, a first probability value of a right-hand operation mode changes by the weight value w2 and a second probability value of a left-hand operation mode changes by the weight value w2;

determine, based on the second change situation, the first probability value of the right-hand operation mode changes by the weight value w3 and the second probability value of the left-hand operation mode changes by the weight value w3;

compare a first magnitude of the first probability value of the right-hand operation mode and a second magnitude of the second probability value of the left-hand operation mode;

identify the right-hand operation mode when the first magnitude of the first probability value of the right-hand operation mode is greater than the second magnitude of the second probability value of the left-hand operation mode;

identify the left-hand operation mode when the first magnitude of the first probability value of the right-hand operation mode is less than the second magnitude of the second probability value of the left-hand operation mode; and automatically switch a display mode of an application displayed in a user interface of the handheld device to match the left-hand operation mode or the right-hand operation mode in response to identifying the left-hand operation mode or the right-hand operation mode.

8. The handheld device of claim 7, wherein the instructions further cause the processor to be configured to:

determine the first probability value of the right-hand operation mode of the handheld device increases by the weight value w2 when the contact area between the user's finger and the touch screen gradually becomes smaller from left to right;

determine the second probability value of the left-hand operation mode of the handheld device increases by the weight value w2 when the contact area between the user's finger and the touch screen gradually becomes larger from left to right;

determine the first probability value of the right-hand operation mode of the handheld device increases by the weight value w3 when the sliding acceleration of the user's finger gradually becomes higher from left to right; and determine the second probability value of the left-hand operation mode of the handheld device increases by the weight value w3 when the sliding acceleration of the user's finger gradually becomes lower from left to right.

9. The handheld device of claim 7, wherein the sliding information further comprises a sliding direction of the user's finger, and wherein the instructions further cause the processor to be configured to:

assign a weight value of the sliding direction of the user's finger to a weight value w1;

determine the first probability value of the right-hand operation mode of the handheld device increases by the weight value w1 when the sliding direction of the user's finger is rightward;

determine the second probability value of the left-hand operation mode of the handheld device increases by the weight value w1 when the sliding direction of the user's finger is leftward;

determine the first probability value of the right-hand operation mode of the handheld device increases by the weight value w2 when the contact area between the user's finger and the touch screen gradually becomes smaller from left to right;

determine the second probability value of the left-hand operation mode of the handheld device increases by the weight value w2 when the contact area between the user's finger and the touch screen gradually becomes larger from left to right;

determine the first probability value of the right-hand operation mode of the handheld device increases by the weight value w3 when the sliding acceleration of the user's finger gradually becomes higher from left to right; and determine the second probability value of the left-hand operation mode of the handheld device increases by the weight value w3 when the sliding acceleration of the user's finger gradually becomes lower from left to right.

10. The handheld device of claim 9, wherein the sliding information further comprises an area within which a pixel passed by the user's finger in the sliding process falls, and wherein the instructions further cause the processor to be configured to:
- assign a weight value of the area within which the pixel passed by the user's finger in the sliding process falls to a weight value w0;
- determine the first probability value of the right-hand operation mode of the handheld device increases by the weight value w0 when the pixel passed by the user's finger falls within a right area of the touch screen;
- determine the second probability value of the left-hand operation mode of the handheld device increases by the weight value w0 when the pixel passed by the user's finger falls within a left area of the touch screen.

11. The handheld device of claim 10, wherein the weight value w0, the weight value w1, the weight value w2, and the weight value w3 are assigned according to a size of the touch screen, and a sliding length and sliding shape of the user's finger on the touch screen.

12. The handheld device of claim 7, wherein a sliding action of the user's finger on the touch screen is an action of unlocking the touch screen.

\* \* \* \* \*

UNITED STATES PATENT AND TRADEMARK OFFICE
CERTIFICATE OF CORRECTION

PATENT NO. : 10,444,951 B2  
APPLICATION NO. : 15/279733  
DATED : October 15, 2019  
INVENTOR(S) : Yuan Fang Page 1 of 1

It is certified that error appears in the above-identified patent and that said Letters Patent is hereby corrected as shown below:

In the Claims

Claim 7, Column 33, Line 40: the letter "e" after the word "device" should be deleted.

Signed and Sealed this
Tenth Day of December, 2019

Andrei Iancu
*Director of the United States Patent and Trademark Office*